(12) United States Patent
Nuta et al.

(10) Patent No.: US 9,641,681 B2
(45) Date of Patent: May 2, 2017

(54) METHODS AND SYSTEMS FOR DETERMINING CONVERSATION QUALITY

(71) Applicant: TalkIQ, Inc., San Francisco, CA (US)

(72) Inventors: Yonathan A. Nuta, San Francisco, CA (US); John P. Evans, Gettysburg, PA (US); James W. Palmer, San Francisco, CA (US); Etienne Manderscheid, San Francsico, CA (US); Cynthia Henderson, San Francisco, CA (US)

(73) Assignee: TalkIQ, Inc., San Francisco, CA (US)

(*) Notice: Subject to any disclaimer, the term of this patent is extended or adjusted under 35 U.S.C. 154(b) by 0 days.

(21) Appl. No.: 15/140,430

(22) Filed: Apr. 27, 2016

(65) Prior Publication Data

US 2016/0316059 A1 Oct. 27, 2016

Related U.S. Application Data

(60) Provisional application No. 62/153,259, filed on Apr. 27, 2015.

(51) Int. Cl.
*H04M 3/00* (2006.01)
*H04M 5/00* (2006.01)
(Continued)

(52) U.S. Cl.
CPC .... *H04M 3/5175* (2013.01); *G06Q 10/06375* (2013.01); *G10L 15/04* (2013.01);
(Continued)

(58) Field of Classification Search
CPC ... H04M 2203/2038; H04M 2203/401; H04M 2203/403; H04M 3/5183
(Continued)

(56) References Cited

U.S. PATENT DOCUMENTS 6,952,406 B2 10/2005 Procopio
7,191,133 B1 3/2007 Pettay
(Continued)

FOREIGN PATENT DOCUMENTS

| WO | WO-2013/184667 A1 | 12/2013 |
| WO | WO-2015/014956 A1 | 2/2015 |
| WO | WO-2015/091893 A1 | 6/2015 |

OTHER PUBLICATIONS

Lin et al., (2009) "Phrase Clustering for Discriminative Learning," Proceedings of the 47th Annual Meeting of the ACL and the 4th IJCNLP of the AFNLP (9 pages).
(Continued)

*Primary Examiner* — Thjuan K Addy
(74) *Attorney, Agent, or Firm* — Goodwin Procter LLP

(57) ABSTRACT

Predictive models may be trained to estimate values of conversation quality metrics for ongoing conversations. A predictive model may be trained to predict the outcome of an ongoing conversation based on the values of conversation quality metrics for the conversation. The trained predictive model may be used to predict the outcome of an ongoing conversation, and/or to provide recommendations to a participant in the conversation regarding adjustments to the participant's communications that are predicted to improve the outcome of the conversation.

30 Claims, 4 Drawing Sheets

(51) Int. Cl.
*H04M 3/51* (2006.01)
*G10L 15/04* (2013.01)
*G10L 15/26* (2006.01)
*G10L 15/06* (2013.01)
*G10L 15/22* (2006.01)
*H04M 3/42* (2006.01)
*G06Q 10/06* (2012.01)

(52) U.S. Cl.
CPC ............ *G10L 15/063* (2013.01); *G10L 15/22* (2013.01); *G10L 15/26* (2013.01); *H04M 3/42221* (2013.01)

(58) Field of Classification Search
USPC ............ 379/265.07, 265.06, 266.08, 265.08
See application file for complete search history.

(56) References Cited

U.S. PATENT DOCUMENTS

| | | | |
|---|---|---|---|
| 7,627,475 B2* | 12/2009 | Petrushin | G10L 17/26 |
| | | | 704/231 |
| 8,457,000 B2 | 6/2013 | West et al. | |
| 8,654,937 B2 | 2/2014 | Agapi et al. | |
| 8,737,571 B1 | 5/2014 | Seeley et al. | |
| 8,781,880 B2 | 7/2014 | Kocsor et al. | |
| 8,861,373 B2 | 10/2014 | Sterman et al. | |
| 9,015,046 B2 | 4/2015 | Pereg et al. | |
| 9,118,751 B2 | 8/2015 | Kolbegger et al. | |
| 9,202,110 B2 | 12/2015 | Movellan et al. | |
| 2006/0235742 A1* | 10/2006 | Castellanos | G06Q 10/04 |
| | | | 705/7.29 |
| 2013/0148525 A1* | 6/2013 | Cuadra Sanchez | H04L 41/147 |
| | | | 370/252 |
| 2014/0278455 A1 | 9/2014 | Chandrasekaran et al. | |
| 2015/0003605 A1 | 1/2015 | Odinak et al. | |
| 2015/0199959 A1 | 7/2015 | Skoglund et al. | |
| 2015/0201077 A1 | 7/2015 | Konig et al. | |
| 2015/0256675 A1* | 9/2015 | Sri | H04M 3/5183 |
| | | | 379/265.09 |

OTHER PUBLICATIONS

International Search Report and Written Opinion for International Application No. PCT/US2016/029634 dated Aug. 18, 2016. (14 pages).

Jeon et al., (Mar. 1, 2014) "Level of Interest Sensing in Spoken Dialog Using Decision-Level Fusion of Acoustic and Lexical Evidence," Computer Speech and Language, vol. 28, No. 2. (14 pages).

Reitter et al, (2007) "Predicting Success in Dialogue," in Proceedings of the 45th Annual Meeting of the Association for Computational Linguistics. (8 pages).

* cited by examiner

METHODS AND SYSTEMS FOR DETERMINING CONVERSATION QUALITY

CROSS-REFERENCE TO RELATED APPLICATION

This application claims priority and benefit under 35 U.S.C. §119(e) of U.S. Provisional Patent Application Ser. No. 62/153,259, titled "Methods And Systems for Analyzing Conversations to Determine the Quality of a Participant's Speech" and filed on Apr. 27, 2015, the content of which is incorporated by reference herein in its entirety.

FIELD OF INVENTION

The present disclosure relates generally to methods and systems for analyzing conversations to determine qualities of the conversations (e.g., the quality of participants' speech). Some embodiments relate specifically to methods and systems for transcribing and analyzing a conversation (e.g., a sales conversation) to determine the quality of the conversation (e.g., the quality of a sales representative's speech) and to provide recommendations for increasing the quality of the conversation (e.g., for improving the sales representative's effectiveness).

BACKGROUND

In many conversations, one or more of the conversation's participants has an objective and attempts to use the conversation to achieve the objective. For example, a participant in a conversation may attempt to persuade other participants to take a particular action or to accept a particular proposition. As just one example, a sales representative may attempt to persuade a potential customer to engage in purchasing behavior (e.g., to schedule a meeting with the sales representative, use a product or service on a trial basis, agree to purchase a product or service, agree to a particular price for a product or service, etc.).

The performance (e.g., effectiveness, persuasiveness, etc.) of a participant in a conversation may be assessed based on the outcome of the conversation (e.g., the extent to which the participant achieves the participant's objective). Business organizations generally measure the performance of a sales representative or sales team based on call volume (the number of sales calls placed), call duration, number of sales, and/or sales revenue.

SUMMARY OF THE INVENTION

Conventional techniques for assessing the performance of a participant in a conversation can be inadequate for certain applications, particularly if the assessments are based primarily on the outcome of the conversation. For example, assessments based on the outcome of a conversation are generally not available until the conversation has ended, and therefore are generally not useful for improving the outcome of the conversation. As another example, assessments based on the outcome of a conversation can help the participant understand whether or not the participant achieved an objective, but may not help the participant understand what the participant could have done differently to obtain a better outcome. Thus, techniques are needed for assessing qualities of ongoing conversations and for determining, during such conversations, how the participants can adjust the parameters of their participation in the conversation to enhance the probability of achieving an objective.

The inventors have recognized and appreciated that when two or more individuals participate in a conversation, relationships between certain characteristics of the participants' contributions to the conversation (e.g., certain characteristics of the participants' speech) may be predictive of the outcome of the conversation. The present disclosure describes conversation quality metrics for evaluating conversations based on communications (e.g., speech) of two or more participants in the conversation, and techniques for estimating the values of such conversation quality metrics. In some embodiments, predictive models are used to estimate the values of such metrics for ongoing conversations. In some embodiments, predictive models are used to predict the outcome of an ongoing conversation based on the values of the conversation quality metrics. In some embodiments, predictive models are used to predict, during a conversation, how a participant can adjust the parameters of his or her contribution to the conversation (e.g., speech) to enhance the probability of achieving an objective.

According to an aspect of the present disclosure, a computer-implemented predictive modeling method is provided, including: obtaining conversation metric data and conversation assessment data for respective conversations included in a plurality of conversations, and training one or more predictive models to provide one or more assessments of an ongoing conversation based, at least in part, on conversation metric data for the ongoing conversation. The metric data for a respective conversation include data indicative of one or more values of one or more metrics for evaluating conversation quality. The one or more metric values are determined based, at least in part, on communications of two or more participants in the conversation. The assessment data for the conversation include data indicative of one or more assessments of the conversation. Training a first of the one or more predictive models includes fitting the first predictive model to training data including the conversation metric data for the plurality of conversations and at least a portion of the conversation assessment data for the plurality of conversations.

In some embodiments, the one or more metrics for evaluating conversation quality include a rapport metric, a proportionality metric, a matching metric, and/or a concern-addressing metric.

In some embodiments, the one or more metric values include a value of the rapport metric for the conversation, and the value of the rapport metric indicates an extent of mutual understanding and/or agreement between two or more participants in the conversation. In some embodiments, the method further includes determining the value of the rapport metric based, at least in part, on a rate of use of words indicating understanding and/or agreement in the communications of the two or more participants in the conversation.

In some embodiments, the one or more metric values include a value of the proportionality metric for the conversation, and the value of the proportionality metric depends on a proportion of communication contributed to the conversation by at least one participant in the conversation. In some embodiments, the method further includes determining the value of the proportionality metric for the at least one participant in the conversation based, at least in part, on a ratio of time during the conversation when the at least one participant is speaking to duration of the conversation. In some embodiments, the value of the proportionality metric further depends on a target value for the proportion of communication contributed to the conversation by the at least one participant. In some embodiments, the target value for the proportion of communication contributed to the conversation by the at least one participant is between 55% and 75%.

In some embodiments, training the one or more predictive models includes: training a first of the predictive models to provide a first assessment of the ongoing conversation during a first phase of the ongoing conversation, and training a second of the predictive models to provide a second assessment of the ongoing conversation during a second phase of the ongoing conversation, wherein the target value for the proportion of communication contributed to the conversation by the at least one participant includes a first target value during the first phase of the ongoing conversation and a second target value different from the first target value during the second phase of the ongoing conversation.

In some embodiments, the one or more metric values include a value of the matching metric for the conversation, and the value of the matching metric depends on an extent to which a communication rate of a first of the participants in the conversation matches a communication rate of a second of the participants in the conversation. In some embodiments, the method further includes determining the value of the matching metric for the first and second participants in the conversation based, at least in part, on a number of words communicated by the first participant during a time period and on a number of words communicated by the second participant during the time period. In some embodiments, the method further includes determining the value of the matching metric for the first and second participants in the conversation based, at least in part, on a duration of an inter-word time period in speech of the first participant and on a duration of an inter-word time period in speech of the second participant. In some embodiments, the value of the matching metric further depends on a target value for the extent to which the communication rate of the first participant matches the communication rate of the second participant. In some embodiments, the target value corresponds to the communication rate of the first participant exceeding the communication rate of the second participant by 10% to 30%.

In some embodiments, the one or more metric values include a value of the concern-addressing metric for the conversation, and the value of the concern-addressing metric indicates an extent to which a first of the participants in the conversation addresses one or more concerns of a second of the participants in the conversation. In some embodiments, the method further includes determining the value of the concern-addressing metric based, at least in part, on a tone of speech of the second participant and/or on words used in the communication of the second participant.

In some embodiments, the one or more metrics for evaluating conversation quality include one or more first metrics for evaluating conversation quality, the metric data for the conversation further include data indicative of one or more values of one or more second metrics for evaluating conversation quality, and the one or more second metric values are determined based, at least in part, on communication of a first of the participants in the conversation. In some embodiments, the one or more second metrics for evaluating conversation quality include a filler-word metric, a topicality metric, a tone metric, and/or a cadence metric.

In some embodiments, the training data further include transcripts of one or more of the conversations and/or audio recordings of one or more of the conversations. In some embodiments, the one or more assessments of the conversation include data indicating (1) occurrence, during or after the conversation, of a particular event, (2) an outcome of the conversation, (3) a duration of the conversation, (4) a score assigned to the conversation, and/or (5) a score assigned to the communication of a first of the participants in the conversation.

In some embodiments, the one or more predictive models include a regression model and/or a classifier. In some embodiments, the classifier includes a Bayes classifier and/or a support vector machine.

According to another aspect of the present disclosure, a system is provided, including one or more computers programmed to perform operations including: obtaining conversation metric data and conversation assessment data for respective conversations included in a plurality of conversations, and training one or more predictive models to provide one or more assessments of an ongoing conversation based, at least in part, on conversation metric data for the ongoing conversation. The metric data for a respective conversation include data indicative of one or more values of one or more metrics for evaluating conversation quality. The one or more metric values are determined based, at least in part, on communications of two or more participants in the conversation. The assessment data for the conversation include data indicative of one or more assessments of the conversation. Training a first of the one or more predictive models includes fitting the first predictive model to training data including the conversation metric data for the plurality of conversations and at least a portion of the conversation assessment data for the plurality of conversations.

According to another aspect of the present disclosure, a computer-implemented predictive modeling method is provided, including: determining an assessment of an ongoing conversation, and providing notification of the assessment of the ongoing conversation. The assessment includes an output of a predictive model. Determining the assessment includes applying a predictive model to first conversation data associated with the conversation. The first conversation data include conversation metric data indicative of one or more values of one or more metrics for evaluating conversation quality. The one or more metric values are determined based, at least in part, on communications of two or more participants in the conversation. The predictive model is fitted to second conversation data associated with a plurality of conversations.

In some embodiments, the assessment of the ongoing conversation includes a score assigned to the conversation and/or a score assigned to the communication of a first of the participants in the conversation. In some embodiments, determining the assessment of the ongoing conversation includes predicting a probability of occurrence, during or after the conversation, of a particular event. In some embodiments, at least some of the communications of the two or more participants relate to the particular event. In some embodiments, determining the assessment of the ongoing conversation includes predicting an outcome of the conversation. In some embodiments, determining the assessment of the ongoing conversation includes predicting a duration of the conversation. In some embodiments, determining the assessment of the ongoing conversation includes estimating a quality of the ongoing conversation.

In some embodiments, providing the notification of the assessment of the ongoing conversation includes sending an electronic communication including data indicative of the assessment to a first of the participants in the conversation and/or to a supervisor of the first participant. In some embodiments, providing the notification of the assessment of the ongoing conversation includes displaying information indicative of the assessment.

In some embodiments, the method further includes determining a recommendation for a first of the participants in the ongoing conversation, and providing the recommendation to the first participant. In some embodiments, the recommendation relates to an adjustment of a value of a parameter of the communication of the first participant. In some embodiments, the parameter of the communication of the first participant is selected from the group consisting of a speech rate of the first participant, a talk-to-listen ratio of the first participant, a cadence rate of the first participant, a filler-word usage rate of the first participant, a keyword usage rate of the first participant, and a tone of the first participant.

In some embodiments, the one or more metrics include a first metric, the one or more metric values include a first value of the first metric, and determining the recommendation includes: determining a difference between the first value of the first metric and a target value of the first metric, and determining that the adjustment of the value of the parameter of the communication of the first participant is predicted to decrease the difference between the first value of the metric and the target value of the metric.

In some embodiments, determining the assessment of the ongoing conversation includes predicting a probability of occurrence, during or after the conversation, of a particular event. In some embodiments, the one or more metrics include a first metric, the one or more metric values include a first value of the first metric, and determining the recommendation includes determining that the adjustment of the value of the parameter of the communication of the first participant is predicted to increase the probability of occurrence of the particular event. In some embodiments, providing the recommendation includes sending an electronic communication including data indicative of the recommendation to the first participant and/or to a supervisor of the first participant. In some embodiments, providing the recommendation includes displaying information indicative of the recommendation.

In some embodiments, the method further includes determining the conversation metric data indicative of the one or more values of the one or more metrics for evaluating conversation quality based, at least in part, on the communications of the two or more participants in the conversation. In some embodiments, determining the conversation metric data includes applying one or more predictive models to the communications of the two or more participants, and wherein the one or more metric values include one or more outputs of the one or more predictive models. In some embodiments, applying the one or more predictive models to the communications of the two or more participants includes applying the one or more predictive models to a transcript of the ongoing conversation and/or to an audio recording of the conversation.

According to another aspect of the present disclosure, a system is provided, including one or more computers programmed to perform operations including: determining an assessment of an ongoing conversation, wherein the assessment includes an output of a predictive model, and providing notification of the assessment of the ongoing conversation. Determining the assessment includes applying a predictive model to first conversation data associated with the conversation. The first conversation data include conversation metric data indicative of one or more values of one or more metrics for evaluating conversation quality. The one or more metric values are determined based, at least in part, on communications of two or more participants in the conversation. The predictive model is fitted to second conversation data associated with a plurality of conversations.

Other aspects and advantages of some embodiments of the invention will become apparent from the following drawings and detailed description, which illustrate the principles of the invention, by way of example only.

Particular implementations of the subject matter described herein can realize one or more of the following advantages. In some embodiments, characteristics of ongoing conversations can be estimated. In some embodiments, outcomes of ongoing conversations can be predicted. In some embodiments, recommendations can be provided to participants in conversations during the conversation. The recommendations can indicate to the participants how they can adjust the parameters of their contributions to the conversation to enhance the probability of achieving their objectives.

The foregoing Summary, including the description of motivations for some embodiments and/or advantages of some embodiments, is intended to assist the reader in understanding the present disclosure, and does not in any way limit the scope of any of the claims.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

The present disclosure describes techniques for improving the accuracy of automatic speech recognition, for analyzing conversations (e.g., sales conversations) to evaluate the quality of a participant's contributions to the conversation (e.g., the quality of a sales representative's speech), and for using speech quality metrics to improve the quality of conversations (e.g., to increase a sale representative's effectiveness). Accurate metrics can facilitate the task of determining whether a participant in a conversation is achieving an objective or participating in the conversation in a manner that is likely to lead to achieving the objective. For example, accurate metrics are needed for determining a sales representative's effectiveness at inducing purchasing behavior. Such metrics could be used to guide sales representatives to speak in ways that are more likely to induce purchasing behavior, and/or to identify sales representatives who consistently engage in high-quality sales calls. In some embodiments, accurate metrics for determining a sales representative's effectiveness may be calculated based on automatic analysis of the speech uttered during the sales representative's sales calls.

Figure 1:
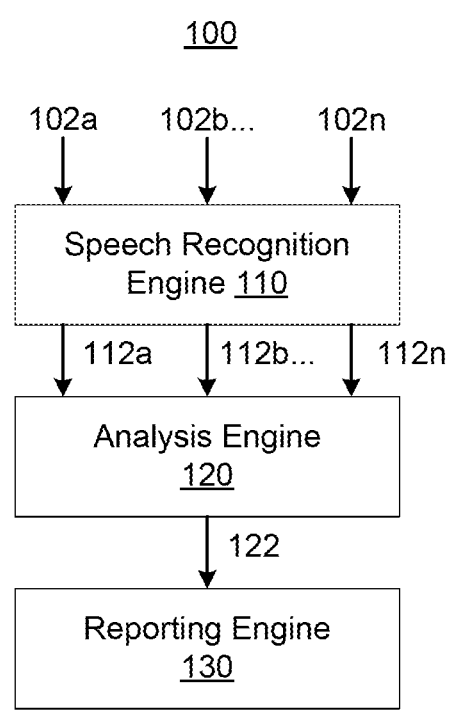
FIG. 1 shows a block diagram of a speech analysis system, according to some embodiments.

FIG. 1 shows a speech analysis system 100, which includes a speech recognition engine 110, an analysis engine 120, and a reporting engine 130, according to some embodiments. The speech recognition engine 110 can generate transcripts 112 of speech data 102 representing speech of one or more speakers (e.g., representing a conversation between the speakers). The analysis engine 120 can analyze the speech data 102 and/or the transcripts 112 to provide assessments of the conversation represented by the speech data and/or transcripts (e.g., to determine one or more qualities of the speech represented by the speech data (e.g., the extent to which a speaker's speech exhibits desired qualities, values of conversation metrics for evaluating conversation quality, or the probability that a speaker's speech will result in a desired outcome)). The reporting engine 130 can report (e.g., display, include in electronic communications, or otherwise present) the transcripts 112 and/or analysis data 122 provided by the analysis engine to one or more of the participants, or to any other suitable observer. Based on the displayed data, participants can modify attributes of their speech to improve its quality and/or to increase the probability of achieving a desired outcome.

Speech Recognition Engine

Figure 2:
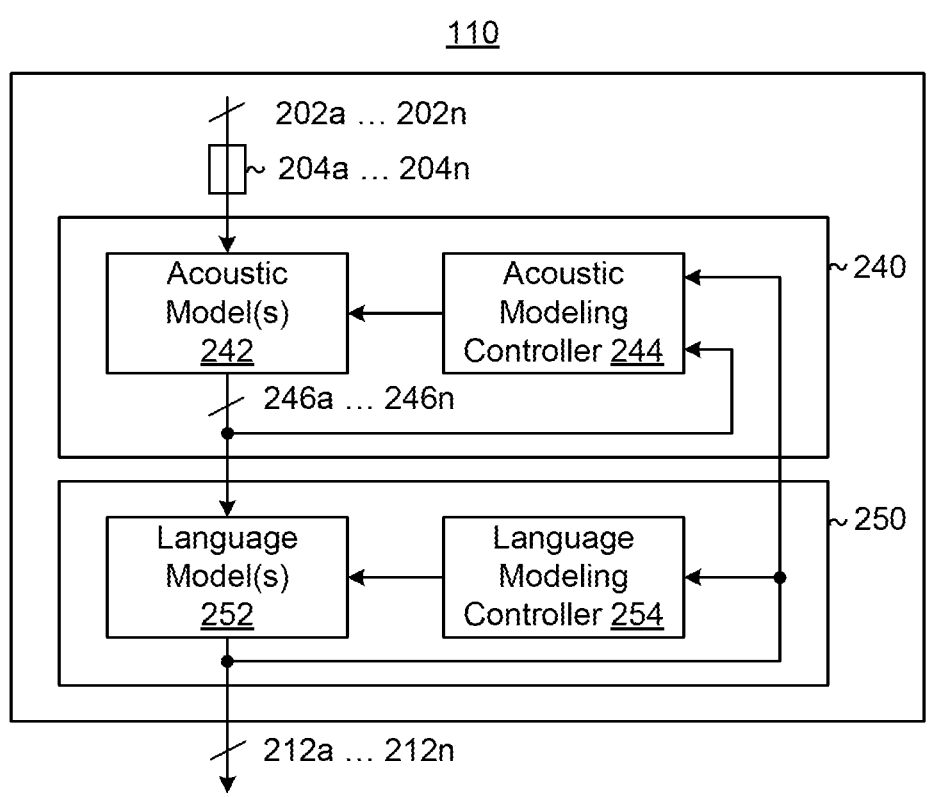
FIG. 2 shows a block diagram of a speech recognition engine, according to some embodiments.

FIG. 2 shows the speech recognition engine 110, according to some embodiments. The speech recognition engine 110 can generate transcripts of speech data 202, which can represent speech from a conversation between two or more participants. The speech data 202 is provided to the speech recognition engine 110 via one or more communication channels 204. The speech recognition engine 110 includes an acoustic modeling engine 240, which determines the sequence(s) 246 of phonemes (or other linguistic units) represented by the speech data. The acoustic modeling engine 240 can include one or more acoustic models 242 and an acoustic modeling controller 244. The speech recognition engine 110 also includes a language modeling engine 250, which determines the sequence(s) 212 of words represented by the speech data. The language modeling engine 250 can include one or more language models 252 and a language modeling controller 254. The operations performed by speech recognition engine 110 and its components are described in further detail below.

The speech data 202 can be provided to the speech recognition engine 110 via a suitable communication channel 204, including, without limitation, communication channels corresponding to microphones and/or telecommunication lines. The speech data 202 can also be provided to the speech recognition engine 110 as one or more electronic files that contain the speech data 202. In some embodiments, each participant's speech is provided to the speech recognition engine 110 via a distinct telecommunication channel. For example, in a telephone call between two participants (e.g., a sales representative and a potential customer), the two participants' speech can be provided to the speech recognition engine via two distinct telecommunication channels. Likewise, in a telephone conference between three or more participants, each participant's speech can be provided to the speech recognition engine 110 via a distinct telecommunication channel. In some embodiments, the bandwidth of each communication channel 204 can be between 4 kHz and 32 kHz (e.g., 8 kHz or 16 kHz). In general, the quality of speech data (e.g., the extent to which the speech data captures the attributes of the corresponding speech) improves as the bandwidth of the corresponding communication channel increases.

Receiving speech from distinct participants over distinct communication channels simplifies the task of determining which participant contributed the various portions of speech to the conversation. However, some embodiments are not limited to configurations in which each participant in a conversation provides speech via a distinct communication channel. In some embodiments, two or more participants can share a communication channel, and speech recognition engine 110 can use a suitable technique, such as speaker recognition based on voice prints, to determine which participant contributed the various portions of speech received via the shared communication channel. In the interest of clarity, in the remainder of the present disclosure it is assumed that each set of speech data 202 represents speech of a single speaker.

In some embodiments, the speech data 202 provided to the speech recognition engine 110 can be formatted into one or more streams of data packets. For example, the speech data 202 associated with each communication channel 204 can be formatted into a distinct stream of data packets. However, some embodiments are not limited to configurations in which speech data is formatted as a stream of data packets. In some embodiments, the speech data corresponding to a communication channel can be formatted as a bit stream, as an analog signal, or in another suitable format.

In some embodiments, the speech signals can be divided into frames of predetermined duration (e.g., 10 ms), and the speech data 202 can encode the frames based on their frequency content. For example, the mel-frequency cepstrum of each frame can be determined, and the speech data 202 can encode each frame's mel-frequency cepstral coefficients (MFCCs). However, some embodiments are not limited to configurations in which the speech data encodes speech signals as MFCCs corresponding to frames of speech. Other types of speech signal encoding techniques are possible.

In some embodiments, one or more noise reduction engines (not shown) can be used to reduce noise in speech data 202 and/or in the speech signals from which speech data 202 is generated. Noise can include any information in the speech data and/or speech signals that is not derived from or does not otherwise correspond to a participant's speech. Removing noise can improve the accuracy of speech recognition engine 110. The noise reduction engine(s) may apply one or more noise reduction techniques, including, without limitation, dynamic noise reduction (DNR), linear filtering, nonlinear filtering, etc. Other types of noise reduction techniques are possible.

In some embodiments, a noise reduction engine can remove ring tone information (e.g., information corresponding to the sound of a telephone ringing before a telephone call is connected) from the speech data 202 and/or from the speech signals. In speech data, a ring tone is typically represented by a relatively large amount of power in a relatively narrow frequency band. In some embodiments, a noise reduction engine can remove ring tone information by identifying the frequency corresponding to the signal with the highest power, and filtering out signals within a narrow band (e.g., +/−40 Hz) around that frequency.

The acoustic modeling engine 240 determines the sequence(s) 246 of phonemes (or other linguistic units) represented by the speech data 202. In some embodiments, the acoustic modeling engine 240 determines a distinct sequence 246 of phonemes represented by each set of speech data 202.

To determine the sequence of phonemes represented by a set of speech data, the acoustic modeling engine 240 can use one or more acoustic models 242. In general, acoustic models probabilistically model relationships between speech data and the phonemes (or other linguistic units) of a language. A probabilistic model generally estimates the probability of an event occurring (e.g., the probability that one or more frames of speech data represent a particular phoneme) based on statistical analysis of historical data (a training corpus of speech data and corresponding phoneme sequences). Examples of probabilistic models include Hidden Markov Models (HMMs), Probabilistic Context-free Grammars (PCFGs), unigram models, N-gram models, etc.

The accuracy with which an acoustic model maps speech data 202 to the corresponding sequence of phonemes can depend on the extent to which the speech data 202 resembles the speech data on which the acoustic model was trained. Thus, an acoustic model trained on speech data having certain characteristics can provide very accurate sequences of phonemes for speech data having similar characteristics, and another acoustic model trained on speech data having different characteristics can provide very accurate sequences of phonemes for speech data having the different characteristics.

Various conditions can have a significant impact on the characteristics of speech data, and therefore can have a significant impact on the accuracy of an acoustic model. For example, different communication channels can distort acoustic waves and/or speech signals differently. The same speech, when converted to electrical signals and transmitted through communication channels with different bandwidths, can produce speech data with significant differences. Thus, an acoustic model trained on speech data corresponding to a communication channel with a relatively wide bandwidth (e.g., 16 kHz) can provide inaccurate results when applied to speech data obtained through a communication channel with a relatively narrow bandwidth (e.g., 8 kHz). Likewise, an acoustic model trained on speech data corresponding to a communication channel with a relatively narrow bandwidth (e.g., 8 kHz) can provide inaccurate results when applied to speech data obtained through a communication channel with a relatively wide bandwidth (e.g., 16 kHz).

As another example, different speakers can pronounce the same phonemes differently. Thus, an acoustic model trained on the speech of a person who speaks with a certain accent or dialect (e.g., a regional dialect) can provide inaccurate results when applied to the speech of a person who speaks with a different accent or dialect.

Acoustic models can be trained to account for variations in the characteristics of speech data, including variations associated with different communication channels and variations associated with different speakers, accents, or dialects. For example, acoustic mixture models trained on speech data with a wide variety of characteristics can provide reasonably accurate results for a wide variety of speech data. However, training an acoustic model on speech data with a wide variety of characteristics can also reduce the acoustic model's accuracy for speech data having a particular set of characteristics (e.g., speech data obtained through a communication channel of a particular bandwidth, speech data for a particular speaker or group of speakers, speech data corresponding to a particular accent or dialect, etc.). In other words, training an acoustic model to recognize speech data with a wide variety of characteristics can reduce the acoustic model's accuracy for speech data with a particular set of characteristics, relative to an acoustic model trained specifically to recognize speech data with the particular set of characteristics.

In some embodiments, the acoustic modeling engine 240 can include a set of acoustic models 242, and acoustic modeling controller 244 can select, for a set of speech data 202, an acoustic model 242 that is expected to provide accurate results for that speech data. The set of acoustic models 242 can include an acoustic model trained to recognize speech data with a wide variety of characteristics, distinct acoustic models trained to recognize speech data obtained through communication channels of different bandwidths (e.g., an acoustic model for 8 kHz communication channels and an acoustic model for 16 kHz communication channels), and/or distinct acoustic models trained to recognize speech corresponding to different accents or dialects. By switching between a wide variety of acoustic models each trained to provide highly accurate results for speech data with specific characteristics, acoustic modeling engine 240 can provide highly accurate results for a wide variety of speech data.

Acoustic modeling controller 244 can select an acoustic model 242 for a set of speech data 202 based on suitable data and/or criteria. In some embodiments, the acoustic modeling controller 244 can determine one or more characteristics (e.g., bandwidth) of the communication channel 204 through which the speech data 202 was obtained, and select an acoustic model 242 trained on speech data obtained through a communication channel with the same or similar characteristics. In some embodiments, the acoustic modeling controller 244 determines the characteristics of the communication channel 204 based on the phone number of the telecommunication line from which the speech data originated, the geographic location of the telecommunication line(s) through which the speech data traveled, the noise level in the speech data, attributes of the recording device that captured the speech data, and/or other suitable data. For example, the acoustic modeling controller can, in some embodiments, use the above-described data to determine whether the participant is using a mobile phone, a landline, or a voice-over-IP (VOIP) system, determine what type of mobile phone the participant is using, identify the telecommunications network through which the speech data traveled, etc. The acoustic modeling controller can then use some or all of the above-described information to infer the characteristics of the communication channel 204.

In some embodiments, the acoustic modeling controller 244 can identify the participant and select an acoustic model trained on speech data provided by the participant. In some embodiments, the acoustic modeling controller 244 can identify the participant's sex/gender and select an acoustic model trained on speech data provided by speakers of the same sex/gender. In some embodiments, the acoustic modeling controller 244 uses multiple acoustic models 242 to generate phoneme sequences for a set of speech data 202, and selects (from the among those phoneme sequences) the phoneme sequences with maximum posterior probability for the speech data 202.

In some embodiments, the acoustic modeling controller 244 can identify one or more utterances in speech data 202 that are associated with speech of a specific accent or dialect, and select an acoustic model 242 trained on speech data corresponding to that accent or dialect. Utterances associated with a specific accent or dialect can be identified using a suitable technique. In some embodiments, the probability distributions of acoustic models trained for different accents or dialects can be analyzed to identify utterances that, individually or in combination, are strongly correlated with a specific accent or dialect and not strongly correlated with other accents or dialects. Such utterances can function as a "signature" for the corresponding accent or dialect. When utterance(s) indicative of a particular accent or dialect are detected in a set of speech data 202, the acoustic modeling controller 244 can select the acoustic model 242 trained for that accent or dialect, and use the selected acoustic model to perform speech recognition on that set of speech data 202.

In some embodiments, acoustic model(s) 242 can include at least one Gaussian mixture model (GMM). The GMM can model multiple, distinct probability distributions for each phoneme, corresponding to distinct pronunciations of the phoneme by people with different accents or dialects. A probability distribution for one phoneme may correlate with probability distributions for other phonemes. For example, a person (or group of people) who pronounce one letter (e.g., "A") in a particular way may also pronounce another letter (e.g., "0") in a particular way, leading to correlation between the probability distributions that correspond to those pronunciations. According to an aspect of the present disclosure, the covariance between probability distributions for one phoneme and probability distributions for other phonemes can be modeled and used to identify probable relationships between the manner in which a speaker pronounces one phoneme and the manner in which the speaker pronounces other phonemes. This technique can improve the accuracy of the speech recognition engine 110.

Returning to FIG. 2, the language modeling engine 250 determines the sequence(s) 212 of words represented by corresponding speech data 202. In particular, the language modeling engine 250 analyzes the sequence 246 of phonemes corresponding to a set of speech data 202 to determine the sequence 212 of words represented by the speech data 202. In some embodiments, the language modeling engine 250 determines a distinct sequence 212 of words represented by each sequence 246 of phonemes. To facilitate reconstruction of a conversation from multiple sequences 212 of words corresponding to multiple sets of speech data 202, the language modeling engine 250 can generate timing data that maps the sequences of words to a common time frame. For example, the language modeling engine 250 can generate a timestamp for each word, phrase, clause, or sentence, such that the conversation can be reconstructed by reproducing (e.g., transcribing or synthesizing speech corresponding to) the words in the relative order and with the relative timing indicated by the timestamps.

To determine the sequence of words represented by a sequence of phonemes, the language modeling engine 250 can use one or more language models 252. In general, language models probabilistically model relationships between sequences of phonemes and corresponding sequences of words. In an N-gram language model, the probability that a word W is the next word in a sequence of words is determined based on the previous N−1 words in the sequence. More precisely, in an N-gram model, the probability that a word $W_J$ is the Jth word in a sequence of words $(W_1, \ldots, W_J)$ is approximated as $P(W_J|W_{J-(N-1)}, \ldots, W_{J-1})$. In some embodiments, the language model(s) 252 can include one or more N-gram language models, where N is a suitable integer (e.g., two, three, four, five, or an integer greater than five). However, the language model(s) 252 are not limited to N-gram language models. In some embodiments, the language model(s) 252 can include other suitable language models (e.g., unigram language models, positional language models, bag-of-concepts models, factored language models, cache language models, etc.).

The accuracy with which a language model 252 maps a sequence 246 of phonemes to a corresponding sequence 212 of words can depend on the manner in which the language model is trained. For example, a language model 252 trained to recognize spoken language (e.g., conversational speech) can provide more accurate results than a language model 252 trained to recognize written language (e.g., written texts) when the two language models are used to recognize spoken language. In some embodiments, language model(s) 252 can include at least one "spoken language model" trained to recognize spoken language. In some embodiments, language modeling engine 250 can use spoken language model(s) 252 to recognize conversational speech (e.g., speech of participants in a telephone call).

As another example, a language model 252 trained to recognize language associated with a particular domain can provide highly accurate results when used to recognize speech that is generally related to that domain. A language model can be trained to recognize language related to a suitable domain, including, without limitation, sales, customer service, technical support, business, medicine, law, finance, etc. In some embodiments, language model(s) 252 can include at least one "domain-specific language model" trained to recognize language related to a domain (e.g., sales). A domain-specific language model for a particular domain (e.g., sales) can be trained using transcripts from a suitable group of conversations relating to that domain (e.g., transcripts totaling at least a specified number of words spoken during such conversations, and/or transcripts from at least a specified number of such conversations). In some embodiments, language modeling engine 250 can use domain-specific language model(s) 252 to recognize speech relating to the corresponding domain.

The inventors have recognized and appreciated that some types of conversations are generally structured such that the conversations generally progress through two or more phases in which different language patterns are used. For example, conversations relating to the sale of a product or service (e.g., conversations between a sales representative and potential customer) can progress through several phases, including a qualification phase, in which the sales representative aims to determine the extent to which the potential customer is a fit for the product or service being sold, a descriptive phase in which the sales representative describes the product, service, and/or provider thereof, a personalization phase in which the sales representative describes how the product or service can provide value to the potential customer, a demo phase, in which the sales representatives demos the product, an inquiry phase in which the potential customer raises questions, objections, or concerns and the sales representative attempts to resolve same, and a negotiation phase in which the sales representative and the potential customer discuss terms of an agreement. A language model 252 trained to recognize language associated with a particular phase of a conversation can provide highly accurate results when used to recognize speech uttered during that phase of a conversation.

In some embodiments, language modeling engine 250 performs topic remodeling. Language models 252 can include distinct "phase-specific language models" trained to recognize language relating to distinct phases of a structured conversation (e.g., a sales call). A phase-specific language model for a particular phase of a conversation can be trained using transcripts from a suitable group of conversations relating to that phase (e.g., transcripts totaling at least a specified number of words spoken during such conversation phases, and/or transcripts from at least a specified number of such conversation phases). In some embodiments, the language modeling engine 250 can use the phase-specific language models 252 to recognize speech uttered during the corresponding phases of a conversation and/or to identify the phase of conversation As another example, a language model 252 trained to recognize the language of a particular speaker or a group of speakers with similar speech patterns (e.g., speakers of a same dialect, speakers who live or have lived in a same region, speakers who are members of a same organization, speakers who work in the same office or department of an organization, etc.) can provide highly accurate results when used to recognize language of that speaker or group of speakers. In some embodiments, language model(s) 252 can include at least one "speaker-specific language model" trained to recognize speech of a particular speaker or group of speakers (e.g., employees of a same business, in a same office, and/or in a same department). A speaker-specific language model for a particular speaker or group of speakers can be trained using transcripts from a suitable group of conversations involving the speaker or members of the group of speakers (e.g., transcripts totaling at least a specified number of words spoken by the speaker or members of the group of speakers, and/or transcripts from at least a specified number of such conversations).

Language modeling controller 254 can select the language model 252 used by language modeling engine 250 to determine the sequence of words 212 corresponding to a set of speech data 202. The selection of a language model 252 can be based on suitable information, including, without limitation, the phone number of the speaker (which can indicate the speaker's identity, the identity of the speaker's employer and/or department, the speaker's location, etc.), keywords detected in the transcript of a portion of a conversation (which can indicate the domain and/or phase of the conversation), the speaker's sex/gender (which can be determined based on the speaker's name and/or characteristics of the speaker's speech), etc. In some embodiments, a participant in a conversation (e.g., a sales representative) can provide control data to language modeling controller 254 to control or influence the selection of a suitable language model 252. For example, a participant can provide control data indicating the participant's identity, organization, location, and/or department, the domain of the conversation, the current phase of the conversation, etc. In some embodiments, the language modeling controller 254 can use a Hidden Markov Model (HMM) to estimate the phase of a conversation.

The inventors have recognized and appreciated that the accuracy of a language model can be enhanced by configuring the language model to recognize classes of words or phrases and to predict when a word in a word sequence 212 is an instance of a recognized class. Although conversations relating to a specified domain can generally exhibit similar language patterns, there can be significant variation in the participants' use of instances of various classes of words, including, without limitation, proper nouns, names (e.g., of people, organizations, etc.), dates, locations, times, and/or numbers (e.g., telephone numbers, prices, digits, etc.). Furthermore, the instances of a class of words uttered by a speaker can correlate with the speaker's identity or the identity of the speaker's organization (e.g., employer). For example, sales representatives from different companies can tend to utter the (different) names of their respective company's employees, brands, products, and/or customers; the (different) locations of their respective company's facilities and/or customers' facilities; the (different) prices of their company's respective products; etc.

According to an aspect of the present disclosure, at least one language model 252 can predict whether the word or phrase at a specified location in a word sequence is an instance of a particular class. In cases where an instance of a particular class is predicted, language model 252 can determine which instance of the class is present using a "class-specific language model" trained to recognize instances of that class. For example, when a language model 252 predicts that the next word or phrase in the sequence is a name (an instance of the name class), the language model 252 can determine which name is present using a class-specific language model trained to recognize names.

A language model can be trained to predict the presence of an instance of a class using a suitable technique. In some embodiments, a training corpus for a language model can be altered to replace instances of classes with symbols representing the respective classes, and the language model can be trained using the altered training corpus. A language model trained in this manner could estimate the probability of occurrence of a particular class as the probability of occurrence of the corresponding symbol.

Class-specific language models can be trained using suitable techniques. In some embodiments, a class-specific language model can be trained using a training corpus that is generally restricted to instances of the class and/or snippets of language that include at least one instance of the class (e.g., a sentence that includes an instance of the class). In some embodiments, a class-specific N-gram language model can be trained using a training corpus that is generally restricted to word sequences of N or fewer words that include at least one instance of the class. The use of class-specific language models leverages the observation that the probability of a particular word $W_J$ in a class C following a sequence of words $W_{J-(N-1)}, \ldots, W_{J-1}$ is equal to the probability of any word in class C following the sequence of words $W_{J-(N-1)}, \ldots, W_{J-1}$ times the probability of a word in class C being word $W_J$.

In some embodiments, the language models 252 can include distinct class-specific language models for distinct contexts (e.g., for distinct domains, phases of conversation, speakers, groups of speakers, organizations, etc.). These context-specific, class-specific language models can be trained to recognize instances of the corresponding class within (or associated with) the corresponding context. For example, the language models 252 can include class-specific language models for Company A, and distinct class-specific language models for Company B. A class-specific language model for Company A can be trained to recognize instances of the corresponding class that are associated with Company A (e.g., names of Company A's products and brands), whereas a class-specific language model for Company B can be trained to recognize instances of the corresponding class that are associated with Company B (e.g., names of Company B's products and brands). Context-specific, class-specific language models can be trained using the above-described techniques for training class-specific language models, but with the training corpus further restricted to words or words sequences extracted from speech associated with the relevant context.

The instances of a class can be identified using a suitable technique, including, but not limited to, pattern recognition (e.g., comparing words or phrases in the training corpus to a group of words or phrases known to be instances of the class), grammar rules (e.g., detecting proper nouns based on capitalization), etc. In some embodiments, context-specific instances of a class can be identified by searching data associated with the context. For example, organization-specific instances of brand, product, name, and/or location classes can be identified by crawling the organization's website, or by searching customer relationship management (CRM) data corresponding to the organization.

According to an aspect of the present disclosure, language model(s) 252 can include a hierarchical language model. A hierarchical language model is adaptable to implement a language model that is specific to one or more contexts (e.g., a domain, conversation phase, speaker, group of speakers, organization, etc.) or generic to one or more of the contexts. For example, a hierarchical language model can be adaptable to implement organization-specific language modeling, or to implement language modeling that is generic to a group of organizations (e.g., a group of sales teams). As another example, a hierarchical language model can be adaptable to implement domain-specific language modeling, speaker-specific language modeling, both, or neither.

In some embodiments, a hierarchical language model can include one or more model parameters which can be adjusted to make the language model specific or generic to a context. For example, a hierarchical language model can be implemented as an artificial neural network (ANN) (e.g., a deep neural network (DNN)) in which a subset of the neural network's connections are reserved for adapting the language model to be specific to one or more contexts. To adapt the language model to be specific to a particular context, the weights of the reserved connections can be set to values corresponding to that context. To adapt the language model to be generic, the reserved connections can be deactivated or the weights of the reserved connections can be set to a default value (e.g., zero). One advantage of hierarchical language models is that portions of the language model that are generic to different language modeling applications can be reused in those different language modeling applications.

A hierarchical language model can be trained using suitable techniques. In some embodiments, the language model can first be trained using a generic training corpus (e.g., a training corpus that is not specific to one or more contexts). During the generic training stage, the reserved connections can be deactivated, or the weights of the reserved connections can be held at a default value (e.g., zero). The language model can then be trained for a particular context using a context-specific training corpus. During the context-specific training stage, the weights of the reserved connections (or a subset thereof) can be changed to provide the context-specific modeling (e.g., without changing the weights of the non-reserved connections). The context-specific training stage can be repeated to train the hierarchical language model to implement other context-specific language models.

For example, a hierarchical language model can be implemented using a neural network with C connections. During the generic training stage, a subset $C_1$ of the connections can be trained using a generic training corpus, with the other ("reserved") connections $C_2$ being deactivated or fixed at a default value. At the completion of the generic training stage, the language model can be capable of performing generic language modeling. During a first context-specific training stage, the reserved connections $C_2$ can be trained using a training corpus specific to Company A. The weights of connections $C_2$ corresponding to Company A can then be stored for future use, and the hierarchical language model can be adapted to implement generic language modeling by deactivating the reserved connections, or to implement language modeling specific to Company A by activating the reserved connections and assigning them the connection weights associated with Company A. During a second context-specific training stage, the reserved connections $C_2$ can be trained using a training corpus specific to Company B. The weights of connections $C_2$ corresponding to Company B can then be stored for future use, and the hierarchical language model can be adapted to implement language modeling specific to Company B by activating the reserved connections and assigning them the connection weights associated with Company B.

In the foregoing example, the reserved connections are trained to adapt the language model to different species (e.g., Company A, Company B) of the same type of context (e.g., organizations). Some embodiments are not limited in this manner. In some embodiments, the reserved connections can be trained to adapt the language model to different types of contexts (e.g., an organization or a conversation phase).

In the foregoing example, all of the reserved connections are trained to adapt the language model to a context. Some embodiments are not limited in this manner. In some embodiments, a subset $C_{21}$ of the reserved connections can be trained to adapt the language model to one type of context (e.g., to an organization), and another subset $C_{22}$ of the reserved connections can be trained to adapt the language model to another type of context (e.g., to a speaker).

In the foregoing example, the hierarchical language model has two tiers, a generic tier and a context-specific tier. Some embodiments are not limited to two tiers. In some embodiments, a context-specific tier can be divided into a hierarchy of context-specific tiers, using the same techniques described above. For example, a subset $C_{21}$ of the reserved connections can be trained to adapt the language model to a group of speakers, while another subset $C_{22}$ of the reserved connections remains disabled. Subsequently, the subset $C_{22}$ of reserved connections can be trained to adapt the language model to an individual speaker in the group of speakers.

In some embodiments, language model(s) 252 can include a grammar model. In general, a grammar model estimates the part of speech of the next word in a sequence of words. In some embodiments, the grammar model can be an N-gram grammar model.

In some embodiments, the speech recognition engine 110 can use the acoustic modeling engine 240 and the language modeling engine 250 to implement a multi-layer speech recognition model. In some embodiments, the multi-layer speech recognition model can include one or more acoustic layers and one or more language layers. For example, a first acoustic layer can translate MFCC distributions to monophones, and a second acoustic layer can map monophones to triphones. A third layer, or first language layer, can map phonemes to words using a custom pronunciation dictionary. A fourth layer, or second language layer, can map words to word sequences. Each layer models the probability of each mapping. The acoustic model(s) used in the acoustic layers can be selected by acoustic modeling controller 244. The language model(s) used in the language layers can be selected by language modeling controller 254.

The multi-layer speech recognition model can include a topic layer. In some embodiments, the topic layer can be implemented by the language modeling controller 254 selecting a language model based on the topic of the participants' speech. In some embodiments, the topic layer can be implemented by training a language model 252 to determine the probability of a word sequence based, at least in part, on the topic of the participants' speech. For example, a hybrid N-gram model can be trained to determine the probability P that a word $W_J$ is the Jth word in a sequence of words $(W_1, \ldots, W_J)$ given the sequence of N−1 previous words $W_{J-(N-1)}, \ldots, W_{J-1}$ and the topic of conversation T. In some embodiments, the topic of the conversation can be determined based on the phase of the conversation, or the phase of the conversation can be substituted for the topic of the conversation in the hybrid language model.

The multi-layer speech recognition model can include a punctuation layer. In some embodiments, at least a portion of the punctuation layer can be implemented in an acoustic model. For example, an acoustic model can predict the presence of a question mark or an exclamation mark based on acoustic features of a participant's speech (e.g., a change in inflection at the end of a sentence for a question mark, or a change in volume and/or tone for an exclamation mark). In some embodiments, at least a portion of the punctuation layer can be implemented in a language model. For example, the language model can treat words and punctuation marks as symbols, and can determine the probability of a sequence of symbols corresponding to a sequence of phonemes based on the previous N−1 symbols.

According to an aspect of the present disclosure, a language model for an organization can be selected or generated from the language models 252 based on a test corpus associated with the context. The test corpus can include transcriptions of a suitable number of conversations involving members of the organization (e.g., a few hundred sales calls involving the organization's sales representatives). The "perplexity" of each language model 252 for the corpus can then be calculated. Perplexity is a measurement of how well the language model predicts a sample. For recognizing speech similar to the corpus, a language model with a lower perplexity value for a corpus is generally more accurate than a language model with a higher perplexity value. In some embodiments, the language model with the lowest perplexity value for the test corpus can be selected as the initial language model for the organization. The selected language model can be further adapted to improve the accuracy of speech recognition for the organization's conversations.

In some embodiments, the initial language model for the organization can be generated by combining aspects of two or more language models 252. The same inputs (e.g., a phoneme sequence and a previous word sequence) can be provided to a set of language models, each of which can produce a candidate word CW and a probability that candidate word CW is the next word in the word sequence. In some cases, a language model can produce multiple, alternative candidate words CW and the probabilities that each of the candidate words CW is the next word in the word sequence. To combine the language models, language modeling engine 250 can assign a weight to each language model, and the probability assigned to a candidate word CW by a constituent language model can be multiplied by the language model's weight. The output of the combined language model can be the set of candidate words produced by the constituent language models and the aggregate weighted probability for each candidate word (e.g., the sum of the weighted probabilities of the constituent language models for the candidate word). In some embodiments, the output of the combined language model can be limited to the most probable candidate word CW and its weighted probability, or to a subset of the candidate words CW and their weighted probabilities.

In some embodiments, the weights are assigned to the constituent language models based on their perplexity values for the test corpus. For example, language models with lower perplexity values for the test corpus can be assigned higher weights, and language models with higher perplexity values can be assigned lower weights. In some embodiments, the weight assigned to a language model can be inversely proportional to the language model's perplexity value.

Returning to FIG. 2, speech recognition engine 110 can perform speech recognition and transcription in real time. One of ordinary skill in the art will appreciate that "real-time" speech recognition and transcription can include speech recognition and transcription that are performed within a suitable time period after the corresponding speech signals are provided to speech recognition engine 110. Depending on the application, a suitable time period can be two seconds or less, one second or less, 500 ms or less, 200 ms or less, 100 ms or less, etc.

Analysis Engine

Returning to FIG. 1, according to an aspect of the present disclosure, analysis engine 120 can analyze the speech data 102 and/or the word sequences 112 (e.g., transcripts) generated by the speech recognition engine 112 to provide assessments of the conversation represented by the speech data and/or transcripts (e.g., to determine one or more characteristics of a conversation, for example, qualities of the speech uttered by some or all participants in a conversation). Such characteristics can include, but are not limited to, the extent to which a participant's speech exhibits specified qualities (e.g., qualities associated with successful sales calls), the probability that a participant's speech will result in a specified outcome (e.g., advancing or converting the conversation into a sale), values of conversation metrics for evaluating conversation quality, etc. In some embodiments, the analysis engine 120 can generate data indicating how a participant can change his or her speech to better exhibit specified qualities and/or to better achieve specified outcomes.

The analysis engine 120 can evaluate the quality of a participant's speech using one or more quality metrics (e.g., conversation quality metrics), including, without limitation, a rapport metric, a proportionality metric (e.g., a "talk-to-listen ratio"), a matching metric (e.g., a cadence-matching metric or "cadence ratio"), a concern-addressing metric, a filler-word metric (e.g., "a filler-word usage rate"), a topicality metric (e.g., a "keyword usage rate"), a tone metric, and/or a cadence metric. These metrics are described below. In some embodiments, the value of a metric is indicative of the value of a parameter of the conversation (e.g., a talk-to-listen ratio of a participant, a cadence ratio of the participants, etc.). In some embodiments, the value of a metric is indicative of a difference between the actual value of a conversation parameter and a target value for the same parameter.

The rapport metric can indicate the extent to which a conversation induces and/or reflects rapport between the participants (e.g., the extent to which a sales representative induces the potential customer to trust and/or agree with the sales representative, the extent to which the conversation indicates that there is mutual understanding and/or agreement among the participants, etc.). Thus, in a sales call, the rapport metric can indicate the extent to which there is mutual understanding and/or agreement between the sales representative and the potential customer. In some embodiments, the value of the rapport metric for a conversation can be determined based, at least in part, on the frequency with which the participants utter words that indicate mutual understanding and/or agreement, including, without limitation, "yes", "yeah", "I understand", "agree", etc.

The proportionality metric can indicate the extent to which each participant is actively participating in the conversation. Thus, in a sales call, the proportionality metric can indicate the extent to which the sales representative and the potential customer are actively participating in the conversation. In some embodiments, the value of the proportionality metric for a conversation can be calculated as the percentage the conversation during which the sales representative is speaking. In some embodiments, the target value for the proportionality metric can be 80%, or another suitable value.

The matching metric can indicate how closely the participants' speech rates match. In some embodiments, a participant's speech rate can be the rate at which the participant utters words during a period in which the participant is speaking (e.g., the average number of words uttered by the participant per minute when the participant is speaking). In some embodiments, a participant's speech rate can be the inverse of the participant's average inter-word duration, excluding long pauses (e.g., periods when the participant goes at least a threshold period of time (e.g., 1.5 seconds) without speaking). In some embodiments, the value of the matching metric can be calculated as the ratio of the participants' speech rates (e.g., the ratio of the sales representative's speech rate to the potential customer's speech rate), the difference between the participants' speech rates, the percentage difference between the participants' speech rates, etc.

In some embodiments, the target value for the matching metric can be a value that indicates that the participants have equal speech rates (e.g., the sales representative's speech rate is equal to the potential customer's speech rate), or a value that indicates that one participant's speech rate is faster than the other participant's speech rate. Thus, if the value of the matching metric is the ratio of the speech rates, the target value can be, for example, between 1.0 and 1.4, between 1.1 and 1.3, or approximately 1.2. In some cases, the target value of the ratio can be between 0.6 and 1.0, between 0.7 and 0.9, or approximately 0.8. If the value of the matching metric is the percentage difference between the speech rates, the target value can be, for example, +/−40%, +/−30%, +/−20%, between 0% and 40%, between 10% and 30%, approximately 20%, between 0% and −40%, between −10% and −30%, or approximately −20%.

Alternatively or in addition, the matching metric can indicate how closely the participants' cadences match. A participant's cadence can be the inverse of the average interval between words spoken by the participant, excluding long intervals (i.e., intervals greater than a predetermined threshold). In some embodiments, the target value for a sales representative's cadence, relative to a potential customer's cadence, can be +/−40%, +/−30%, +/−20%, +/−10%, +/−5%, between 0% and 10%, between 10% and 20%, approximately 20%, between 20% and 30%, between 30% and 40%, between 0% and −10%, between −10% and −20%, approximately −20%, between −20% and −30%, or between −30% and −40%. The phrase "cadence mirroring" may be used to refer situations in which one participant (e.g., a sales representative) matches his or her cadence to the cadence of another participant (e.g., a potential customer).

The filler-word metric can indicate the extent to which a participant's speech includes filler words, including, but not limited to "uh", "um", "ah", "ya", "umm", "uhh", "oh", "mmm", "mmhmm", "hmm", "mmh", and/or other words or sounds indicating that the speaker has paused speaking (e.g., to think) but is not finished speaking. In some embodiments, the value of the filler-word metric can be the rate at which the participant utters filler words during a period in which the participant is speaking (e.g., the average number of filler words uttered by the participant per minute when the participant is speaking). In some embodiments, the target value for the filler-word metric can be greater than zero filler words per minute, because failure to use any filler words can sound unnatural. In some embodiments, the target value for the filler-word metric can be less than a threshold value, because the use of too many filler words can distract from the participant's message. In some embodiments, the target value for the filler-word metric can be between three and seven filler words per minute, between three and five filler words per minute, etc.

The concern-addressing metric can indicate the extent to which a participant (e.g., a sales representative) has addressed the concerns (e.g., objections, questions, etc.) of another participant (e.g., a potential customer). In some embodiments, speech analysis system 100 can determine that a participant has a concern based on the participant's tone (or change in tone), the participant's use of predetermined keywords (e.g., "who", "what", "when", "why", "how", "no", "disagree", etc.), and/or using another suitable technique. In some embodiments, speech analysis system 100 can determine that a participant's concern has been resolved based on the participant's tone (or change in tone), the participant's use of predetermined keywords (e.g., "okay", "that makes sense", "got it", etc.), and/or using another suitable technique.

The topicality metric can indicate the extent to which a participant (e.g., a sales representative) speaks about a set of predetermined topics (e.g., topics addressed in a guide or script for a sales call). In some embodiments, the value of the topicality metric can depend on the percentage of the participant's speech that relates to at least one of the predetermined topics, the number or percentage of predetermined topics addressed by the participant's speech, and/or other suitable data.

The tone and cadence metrics can indicate the extent to which a participant's tone and cadence indicate that the participant is interested in, enthusiastic about, and/or pleased with the conversation.

In some embodiments, target values for one of more speech quality metrics (e.g., conversation quality metrics) can be determined empirically. For example, the values of such metrics can be calculated for a sample set of conversations (e.g., sales calls), and relationships between these values and other indicators of speech quality (e.g., the length of the conversation, the phase to which the conversation progresses, whether the conversation results in a desired outcome (e.g., a sale), a quality rating assigned by an observer, etc.) can be determined (e.g., through regression and/or mathematical transformations). The value(s) or value range(s) for a speech quality metric that predict other indicators of speech quality (e.g., conversation quality) can be selected as the target value(s) or range(s) for that metric. In some embodiments, distinct target values for speech quality metrics can be determined for distinct phases of a conversation.

In some embodiments, values of two or more speech quality metrics can be combined to generate a combined (e.g., overall) speech quality value (e.g., conversation quality value). In some embodiments, a combined quality metric can be calculated based on the matching metric, the proportionality metric, the filler-word metric, and the topicality metric. In some embodiments, the combined quality metric ("CQM") can be calculated as a combination (e.g., a sum) of a first function of the actual and target values of the matching metric, a second function of the actual and target values of the proportionality metric, a third function of the actual and target values of the filler-word metric, and a fourth function of the actual and target values of the topicality metric. As just one example, CQM can be calculated as a combination (e.g., a weighted sum) of the absolute value of a first function of the difference between the actual and target values of the matching metric, a second function of the difference between the actual and target values of the proportionality metric, a third function of the difference between the actual and target values of the filler-word metric, and a fourth function of the difference between the actual and target values of the topicality metric. In some embodiments, the weights assigned to each term of the weighted sum can be determined by regression. In some embodiments, the square roots of the actual and target metric values can be used to determine the combined quality metric CQM, rather than using the raw metric values. This transformation tends to stabilize the variance around the center point of the distribution. In some embodiments, the CQM can be quantitatively related to the duration of a sales call (e.g., through regression, including but not limited to linearized regression), which can be a strong predictor of whether the call results in a sale.

According to an aspect of the present disclosure, analysis engine 120 can use machine learning techniques to assess the characteristics of a conversation (e.g., to evaluate the quality of a participant's speech, to predict an outcome of the conversation, etc.). For example, a sample set of conversations can be transcribed, and one or more values indicating the quality of a participant's speech can be assigned to the conversation. Machine learning techniques can then be applied to the transcriptions and/or the quality values (and, optionally, the speech data) to identify characteristics of speech (or conversations) that are associated with high-quality speech (or conversations). For example, the speech data, transcripts and corresponding quality values can be used to train a predictive model of speech quality (e.g., a speech quality classifier). The predictive model (e.g., speech quality classifier) can then be used to determine the quality of a participant's speech during or after a conversation, based on the speech data and a transcript of the conversation. In some embodiments, the speech quality classifier can generate a single value (e.g., a "score") representing the overall quality of a participant's speech or the overall quality of the conversation. In some embodiments, the speech quality classifier can generate multiple values representing the quality of a participant's speech, including, but not limited to, values of the above-described speech quality metrics.

Any suitable type of predictive model may be used to provide an assessment of a conversation. In some embodiments, the predictive model includes one or more classifiers. For example, the predictive model may include one or more decision trees, artificial neural networks, support vector machines, or Bayesian networks. The predictive model(s) may be generated using any suitable technique, including, without limitation, machine learning techniques. For example, a predictive model may be generated by statistically analyzing a corpus of training data. The training data may include, for example, transcripts of conversations, audio recordings of the conversations, values of conversation quality metrics for the conversations, data indicative of the outcomes of the conversations and/or events that occurred during or after the conversations, recommendations for improving the outcomes of the conversations, etc.

In some embodiments, different predictive models may be used to map conversation data (e.g., transcripts and/or audio recordings of the participants' speech) to values of the above-described quality metrics. In some embodiments, a predictive model may be used to map the values of the above-described quality metrics for a conversation to assessments of the conversation, including, without limitation, a score representing an estimated quality of the conversation, the probability of an event occurring during or after the conversation (e.g., the conversation advancing to a particular phase, a participant achieving his or her objective (e.g., closing a sale), etc.), a predicted outcome of the conversation (e.g., a phase to which the conversation is predicted to progress, whether the participant is predicted to achieve his or her objective, the predicted duration of the conversation, etc.). The outputs of the predictive model(s) may be provided in any suitable format, including, without limitation a binary value, a value selected from a set of two or more possible values, a numerical score (e.g., a value within a range of values), etc.

In some embodiments, classifiers can be used to identify the objections of a conversation participant (e.g., a potential customer), to identify the phase of a conversation (e.g., a sales call), to determine the quality of a participant's speech (e.g., a sales representative's speech) or the quality of a conversation (e.g., a sales conversation), etc. The input to the classifier can be a vector of words associated with a transcript of a conversation. The vector of words can be obtained by removing stop words (e.g., "the", "and", etc.) from the transcript, stemming the remaining words, and applying a feature selection algorithm to the remaining words to select the words to be included in the word vector. In some embodiments, the feature selector is an "information gain" feature selector, which selects the words most informative (e.g., most salient) for a classifier based on specified criteria. The selected words are added to the word vector, which is then provided to a suitable classifier (e.g., a naïve Bayes classifier, a support vector machine, etc.). In some embodiments, the process of generating the word vector can be applied to individual words in the transcript, to bigrams (pairs of words) in the transcript, to trigrams (sets of three contiguous words) in the transcript, or to the output generated by a semantic interpreter based on the transcript.

In some embodiments, clustering can be used to identify previously unidentified objections of conversation participants, previously unidentified keywords used by the conversation participants, previously unidentified phases of a conversation, etc. A suitable clustering algorithm can be applied to the transcript of a conversation and/or to data derived from the transcript of a conversation to obtain the desired output.

In some embodiments, analysis engine 120 can forecast outcomes of one or more events based, at least in part, on data representing the quality of a participant's speech. For example, analysis engine 120 can forecast call duration, sales volume, or revenue based on speech quality data for sales calls. In some embodiments, the sales forecasts can also be based on other data, including, but not limited to, sales call duration and/or number of sales calls.

In some embodiments, analysis engine 120 can create and store records of conversations. A record of a conversation can include suitable data associated with the conversation, including, but not limited to, the date/time when the conversation begins, the date/time when the conversation ends, the duration of the conversation, the names (or other identifying information) of the participants in the conversation, the stage to which the conversation progressed, the outcome of the conversation, and/or a transcript of the conversation.

In some embodiments, the analysis engine 120 can deconstruct a conversation. Deconstructing a conversation can involve identifying instances of predetermined types of information (e.g., dates, names, locations, keywords, etc.) uttered during the conversation. In some embodiments, the analysis engine 120 can store the deconstructed information in the record associated with a conversation.

In some embodiments, the analysis engine 120 can implement a search function, whereby a user can perform searches of the conversation records, including, without limitation, database queries of a database in which the records are stored, keyword searches of the transcripts, regular expression searches of the transcripts, etc.

In some embodiments, the analysis engine 120 can generate a reader-friendly transcript of a conversation. In some embodiments, the reader-friendly transcript of the conversation may be searchable. In the reader-friendly transcript of the conversation, some portions of a speaker's speech (e.g., words, phrases, clauses, and/or sentences) that were interrupted by or interspersed with portions of another speaker's speech can be presented in a contiguous block. The grouping of portions of a speaker's speech into contiguous blocks can be facilitated by (1) removing filler words from the transcript, (2) removing isolated words or phrases from the transcript if the isolated words/phrases are not commonly used as stand-alone statements, (3) ignoring short pauses in the conversation, and/or by another suitable technique. A "short pause" in a conversation can include a pause of duration less than a threshold duration. The threshold duration can be universal, specific to a group of speakers, or specific to the speaker. In some embodiments, the threshold duration can be slightly less than the average duration of a pause at the end of a sentence and/or approximately equal to the average duration of a pause between consecutive words by a participant. In some embodiments, pauses exceeding the threshold value(s) indicate breaks between blocks of conversation. Grouping portions of a speaker's speech into contiguous blocks as described above can facilitate presentation (e.g., display) of the transcript, particularly portions of the transcript corresponding to time periods in which two or more participants were speaking simultaneously.

In summary, the analysis data 122 generated by analysis engine 120 can include suitable data generated by analyzing speech data 102 and/or transcripts 112, including, without limitation, speech quality metrics, speech quality values, forecasts, records of conversations, reader-friendly transcripts, data indicating how a participant can change his or her speech to better exhibit specified qualities and/or to better achieve specified outcomes, etc.

Reporting Engine

Returning to FIG. 1, according to an aspect of the present disclosure, reporting engine 130 can report (e.g., display or otherwise present) the transcripts 112 generated by speech recognition engine 110 and/or analysis data 122 provided by analysis engine 120. In some embodiments, reporting engine 130 can report information through a user interface (e.g., a dashboard user interface).

In some embodiments, reporting engine 130 can display a transcript 112 of a conversation. The transcript can be formatted in suitable ways. In some embodiments, the speech of all participants can be displayed in a single column. In some embodiments, the speech of different participants can be displayed in different columns. In some embodiments, the reader-friendly version of the transcript generated by analysis engine 120 can be displayed, such that some portions of a speaker's speech that were interrupted by or interspersed with portions of another speaker's speech can be presented in a contiguous block. In some embodiments, the displayed transcript can be searchable. In some embodiments, the user can initiate playback of the speech corresponding to a portion of the transcription by selecting that portion of the transcript.

In some embodiments, reporting engine 130 can display the values of one or more speech quality metrics. In some embodiments, the speech quality metrics for a conversation can be displayed to a participant (e.g., a sales representative) while the conversation is ongoing. In some embodiments, reporting engine 130 can display values derived from one or more speech quality metrics, including, but not limited to, values indicating the differences between the actual and target values of the speech quality metrics. Reporting such values while the conversation is ongoing can motivate the participant to alter his or her speech patterns to improve the values of the quality metrics. In some embodiments the reporting engine can guide participant speech by suggesting a change in cadence, frequency of filler words, use of rapport building phrases, script adherence, and/or other measures. In some embodiments, the analysis engine 120 can recognize objections by a participant (e.g., a potential customer), and the reporting engine can suggest high quality responses to those objections, where objection response quality is determined by the response's historical effectiveness in resolving the objection and/or other data. In some embodiments, the speech quality metrics for a conversation can be displayed after the conversation is concluded. The reported values of the metrics can correspond to a single stage of a conversation (e.g., the current stage of the conversation), a single conversation (e.g., the current conversation), two or more conversations (e.g., all the participant's conversations during a specified time period, including, without limitation, an hour, day, week, month, or year.

In some embodiments, the reporting engine 130 can notify a participant (e.g., a sales representative) that another participant has expressed a concern. In some embodiments, the reporting engine 130 can prompt the participant to address the concern in a specified way (e.g., make specified statements or to discuss specified topics related to the customer's concern).

In some embodiments, the reporting engine 130 can permit a participant's supervisor to monitor the progress of an ongoing conversation (e.g., to listen to an ongoing sales call). In some embodiments, the user interface can permit the supervisor to join the ongoing conversation (e.g., by connecting the supervisor's phone to the ongoing call), to mute the speech of a participant, and/or to disconnect a participant from the call In some embodiments the reporting engine 130 can recommend certain conversations or sales representatives for a supervisor's attention based on high or low scores on one or more particular quality metrics.

In some embodiments the reporting engine 130 can recommend sales policies adjustments (e.g., changes to recommended responses to particular objections; changes to scripts; changes to target values of speech/conversation quality metrics) based on the relation of these responses, scripts, and/or metrics to the success of previous sales conversations.

Predictive Modeling Techniques

Figure 3A:
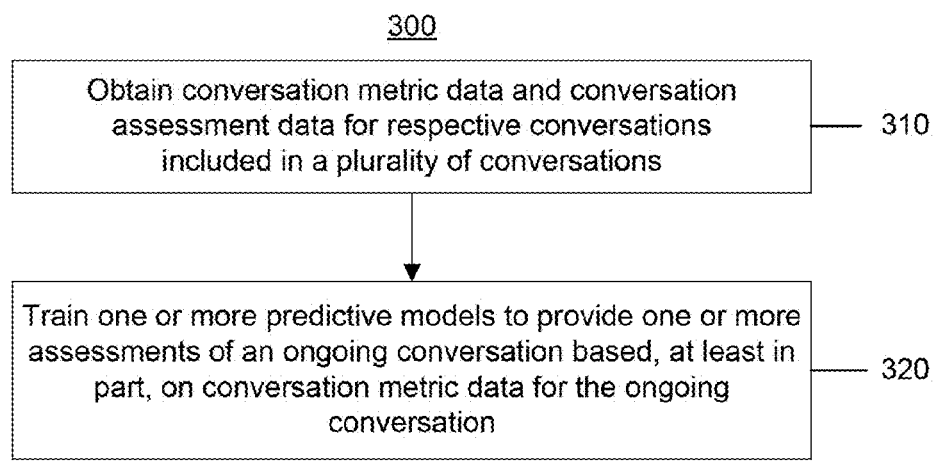
FIG. 3A shows a flowchart of a predictive modeling method, according to some embodiments.

FIG. 3A illustrates a method 300 for training a predictive model to provide assessments of ongoing conversations, according to some embodiments. In some embodiments, the training method 300 includes a step 310 of obtaining conversation metric data and conversation assessment data for respective conversations included in a plurality of conversations, and a step 320 of training one or more predictive models to provide one or more assessments of an ongoing conversation based, at least in part, on conversation metric data for the ongoing conversation. Some embodiments of the training method 300 are described in further detail below. In some embodiments, the training method 300 may be performed by a speech analysis system 100 or 400 as described herein.

In step 310, conversation metric data for respective conversations is obtained. The conversation metric data for a respective conversation may include data indicative of one or more values of one or more metrics for evaluating conversation quality. The one or more metric values may be determined based, at least in part, on communications of two or more participants in the conversation. Metrics for evaluating conversation quality based on communications of two or more participants may include, without limitation, the above-described rapport metric, proportionality metric, matching metric, and/or concern-addressing metric.

As described above, the value of the rapport metric may indicate an extent of mutual understanding and/or agreement between two or more participants in a conversation. The value of the rapport metric for a conversation may be determined based, at least in part, on the rate of use of words indicating understanding and/or agreement in the communications of the conversation's participants. Other techniques for determining the value of the rapport metric may be used. The value of the rapport metric may further depend on a target value for the extent of mutual understanding and/or agreement between the participants.

As described above, the proportionality metric may indicate the proportional relationships among the participants' contributions to the conversation. Thus, the value of the proportionality metric may depend on the proportion of communication contributed to the conversation by the participants in the conversation. In some embodiments, the value of the proportionality metric represents the talk-to-listen ratio for a participant. The value of the proportionality metric for a participant may be determined based, at least in part, on the ratio between the time during the conversation when the participant is speaking and the total duration of the conversation. Other techniques for determining the value of the matching metric may be used. The value of the proportionality metric may further depend on a target value for the proportion of communication contributed to the conversation by a participant. For example, the value of the proportionality metric may indicate the extent of the discrepancy between the actual proportion of communication contributed by a participant and the target proportion. In some embodiments, the target value for the proportion of communication contributed to the conversation by a participant is between 55% and 75%.

As described above, the value of the matching metric may indicate an extent to which a communication rate of a first of the participants in the conversation matches a communication rate of a second of the participants in the conversation. The value of the matching metric for two participants in a conversation may be determined based, at least in part, on (1) the number of words communicated by the two participants during a time period, and/or (2) the duration of inter-word time periods in the speech of the two participants. Other techniques for determining the value of the matching metric may be used. The value of the matching metric may further depend on a target value for the extent to which the communication rates of the participants match. In some embodiments, the target value for the matching metric corresponds to the communication rate of the first participant exceeding the communication rate of the second participant by 10% to 30%.

As described above, the value of the concern-addressing metric indicates an extent to which a participant in the conversation addresses one or more concerns of another participant. The value of the concern-addressing metric may be determined based, at least in part, on a tone of speech of the second participant and/or on words used in the communication of the second participant. Other techniques for determining the value of the matching metric may be used. The value of the concern-addressing metric may further depend on a target value for the extent to which a participant addresses (e.g., responds to or resolves) another participant's concerns.

Some examples of target values for conversation quality metrics have been described. In some embodiments, different target values for one or more conversation quality metrics may be used during different phases of a conversation.

Returning to step 310 of the training method 300, the conversation metric data may further include data indicative of metrics for evaluating conversation quality based on communications of individual participants in the conversation. Metrics for evaluating conversation quality based on communications of individual participants may include, without limitation, the above-described filler-word metric, topicality metric, tone metric, and/or cadence metric.

In step 310, conversation assessment data for the respective conversations is also obtained. The assessment data for a conversation may include data indicative of one or more assessments of the conversation. As described above, an assessment of a conversation may include data indicating (1) the occurrence or non-occurrence, during or after the conversation, of a particular event (e.g., the formation of an agreement between the participants for the purchase and sale of products and/or services), (2) the outcome of the conversation (e.g., the attainment of objective(s) by a participant, the formation of an agreement between the participants for the purchase and sale of products and/or services, etc.), (3) the duration of the conversation, (4) a score assigned to the conversation (e.g., representing the quality of the conversation), and/or (5) a score assigned to the contributions of a participant in the conversation (e.g., representing the quality of a participant's contributions to the conversation). In some embodiments, the assessment data may include data indicative of one or more recommended adjustments to parameters of a participant's communications, which, if adopted by the participant during the conversation, may have improved the outcome of the conversation. Other assessments of a conversation may be used.

In step 320 of the training method 300, one or more predictive models may be trained to provide one or more assessments of an ongoing conversation based, at least in part, on conversation metric data for the ongoing conversation. The predictive model(s) may be trained by fitting the predictive model(s) to training data. The training data may include the conversation metric data obtained in step 310, and at least a portion of the conversation assessment data obtained in step 310. In some embodiments, the training data further include transcripts of one or more of the conversations and/or audio recordings of one or more of the conversations. Some examples of predictive models are described above. Other suitable types of predictive models may be used.

Figure 3B:
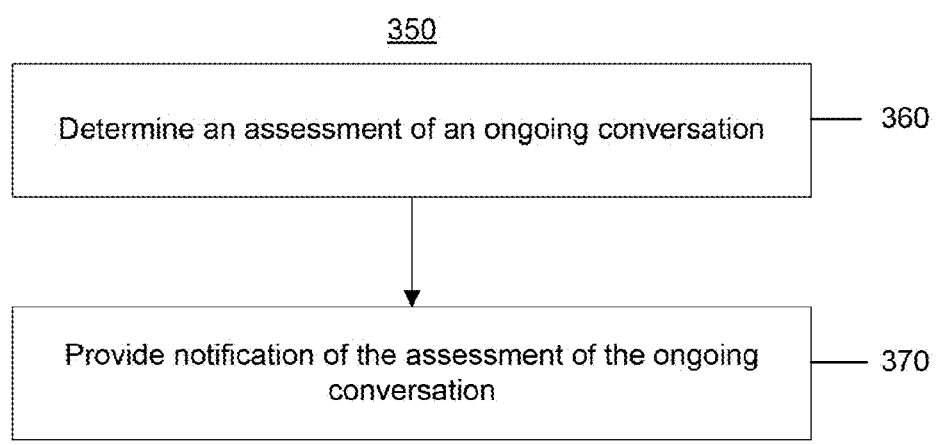
FIG. 3B shows a flowchart of another predictive modeling method, according to some embodiments.

FIG. 3B illustrates a method 350 for using a predictive model to provide assessments of an ongoing conversation, according to some embodiments. In some embodiments, the assessment method 350 includes a step 360 of determining an assessment of an ongoing conversation, and a step 370 of providing notification of the assessment of the ongoing conversation. Some embodiments of the assessment method 350 are described in further detail below. In some embodiments, the assessment method 350 may be performed by a speech analysis system 100 or 400 as described herein.

In step 360, an assessment of an ongoing conversation is determined. The assessment may include the output of a predictive model. The assessment may be determined by applying a predictive model to conversation data associated with the conversation, which may include conversation metric data indicative of one or more values of one or more metrics for evaluating conversation quality. The metric values may be determined based, at least in part, on communications of participants in the conversation. The predictive model may be fitted to conversation data from other conversations.

Some examples of assessments of conversations are described above. In some embodiments, determining the assessment of the ongoing conversation includes estimating a score associated with the conversation (e.g., a score representing the quality of the conversation, representing the quality of a participant's performance in the conversation, etc.). In some embodiments, determining the assessment of the ongoing conversation includes predicting a probability of occurrence, during or after the conversation, of a particular event (e.g., the attainment of objective(s) by a participant, the formation of an agreement between the participants for the purchase and sale of products and/or services, etc.). In some embodiments, determining the assessment of the ongoing conversation includes predicting an outcome of the conversation (e.g., the attainment of objective(s) by a participant, the formation of an agreement between the participants for the purchase and sale of products and/or services, etc.) and/or a duration of the conversation.

In step 370, notification of the assessment of the ongoing conversation is provided. In some embodiments, the notification is provided by sending an electronic communication including data indicative of the assessment to a participant in the conversation and/or to a supervisor of the participant. In some embodiments, the notification is provided by displaying information indicative of the assessment. Other techniques for providing the notification may be used.

In some embodiments, the assessment method 350 further includes steps of determining a recommendation for a participant in the ongoing conversation and providing the recommendation to the participant. As described above, such a recommendation may relate to an adjustment of a value of a parameter of the communication of the participant. Some examples of communication parameters may include, without limitation, speech rate, talk-to-listen ratio, cadence rate, filler-word usage rate, keyword usage rate, and tone.

In some embodiments, the recommendation is determined based on the output of the predictive model. For example, the predictive model may provide an output indicating a predicted outcome of the conversation or a predicted probability of occurrence (e.g., during or after the conversation) of a particular event, and the recommendation may be determined by identifying adjustments to the participant's communication parameters that are predicted to improve the predicted outcome of the conversation or increase the probability of occurrence of the event.

In some embodiments, the recommendation is not based on the output of the predictive model. For example, the recommendation may be determined by determining a difference between the actual value of a conversation quality metric for the ongoing conversation and a target value of the metric, and by identifying adjustments to the participant's communication parameters that are predicted to decrease the difference between the actual and target values of the metric.

The recommendation may be provided to the participant by sending an electronic communication including data indicative of the recommendation to the participant, or by displaying information indicative of the recommendation. Other techniques for providing the recommendation may be used.

The conversation metric data provided as input to the predictive model in step 350 may be obtained using any suitable technique. As described above, the conversation metric data may be obtained by applying one or more predictive models to the communications of the conversation's participants.

Further Description of Some Embodiments

Embodiments have been described in which speech from sales calls is analyzed to determine the quality of the sales call, to determine a sales representative's effectiveness at inducing purchasing behavior, to provide feedback to a sales representative regarding the quality of his or her speech and/or to adjust the sales or customer service policies of an organization. In some embodiments, the techniques described herein can be applied to customer service conversations and/or technical support conversations. For such conversations, speech analysis system 100 can determine the effectiveness of a customer support representative or a technical support representative at identifying and/or resolving a customer's concerns. In some embodiments, the techniques described herein can be applied to business meetings, to determine whether a participant manages a team effectively, contributes to group discussions, supports a proposal, and/or understands a topic of conversation.

In some embodiments, speech analysis system 100 can be integrated with a telephony application (e.g., a software dialer). The telephony application can recognize a phone number in another application and convert the phone number into a selectable link. When a user selects the link, the telephony application ring's the user's phone number and the phone number associated with the selected link, and connects a call between the corresponding phones. The phones then convert the participants' speech into speech data 102, which is sent to speech analysis system 100 for analysis.

Embodiments have been described in which an initial language model for an organization is generated by combining two or more constituent language models (e.g., by combining the weighted outputs of the constituent language models, where a language model's weight depends on its perplexity value for a test corpus). In some embodiments, any language two or more language models can be combined to generate a combined language model for any purpose.

In some embodiments, one or more of the tools and techniques described herein may be accessed through a graphical user interface (GUI). In some embodiments, the GUI may include features for tracking the efforts and effectiveness of a sales team and/or its members. For example, the GUI may provide access to a log of sales calls placed and/or received by members of the sales team (e.g., the date and time of the call, the duration of the call, the identity of the sales representative(s) on the call, the identity and/or phone number of the potential customer on the call, the disposition of the call, etc.). In some embodiments, the GUI may facilitate gamification of sales tasks (e.g., by displaying a leaderboard in which members of the sales team are ranked according to suitable criteria). In some embodiments, the GUI may display information related to active calls (e.g., the time when the call began, the identity of the sales representative(s) on the call, the identity and/or phone number of the potential customer on the call, etc.). In some embodiments, the GUI may provide access to transcripts of conversations (e.g., sales calls). In some embodiments, such transcripts may be generated automatically (e.g., using automatic speech recognition techniques). In some embodiments, the transcripts may be displayed in diarized format (e.g., with the speech of one participant on one side of the interface, and with the speech of the other participant on the other side of the interface). In some embodiments, the GUI may provide access to visualizations of analytics based on the conversation quality metrics and techniques described herein (e.g., values of conversation quality metrics for individual sales calls (including but not limited to ongoing sales calls), for calls of a specified sales representative, for made on specified dates, for calls relating to sales opportunities at a specified stage, etc.).

The inventors have recognized and appreciated that increased duration of sales calls is generally correlated with better outcomes (e.g., increased sales). For example, the inventors have recognized and appreciated that calls that result in sales may be, on average, 1.8 times longer than calls that do not result in sales.

The inventors have recognized and appreciated that the conventional practice of a sales representative mirroring a potential customer's cadence may be less effective than speaking approximately 20% (e.g., 10%-30%) faster than the potential customer. Accordingly, in some embodiments, the target value for the matching metric may be approximately 1.2 (indicating, for example, a target speech rate or cadence rate for the sales representative that is 20% greater than the speech rate or cadence rate for the potential customer).

The inventors have recognized and appreciated that the conventional practice of a sales representative speaking during 80% of the sales conversation and listening during 20% of the sales conversation may be less effective than the sales representative speaking during approximately 65% (e.g., 60%-70% or 55%-75%) of the conversation and listening during approximately 35% (e.g., 30%-40% or 25%-45%) of the conversation. Accordingly, in some embodiments, the target value for the proportionality metric may be approximately 65% (indicating, for example, a target talk-to-listen ratio of approximately 65% for the sales representative).

The inventors have recognized and appreciated that the conventional practice of a sales representative minimizing the use of filler words during a sales conversation may be less effective than the sales representative using approximately five filler words per minute (e.g., three to five filler words per minute, three to seven filler words per minute, or three to ten filler words per minute). Accordingly, in some embodiments, the target value for the filler word metric may be approximately five filler words per minute.

Sales representatives may be provided with scripts or sample statements for use during sales conversations. The scripts or sample statements may contain keywords. The inventors have recognized and appreciated that sales conversations in which the sales representative utters approximately 3.8 (e.g., 3-5, 2-6, or 1-7) keywords per minute may tend to be more effective than sales conversations in which keywords are uttered at a different rate. Accordingly, in some embodiments, the target value for the topicality metric may be approximately 3.8 keywords per minute.

Representative Implementation

Figure 4:
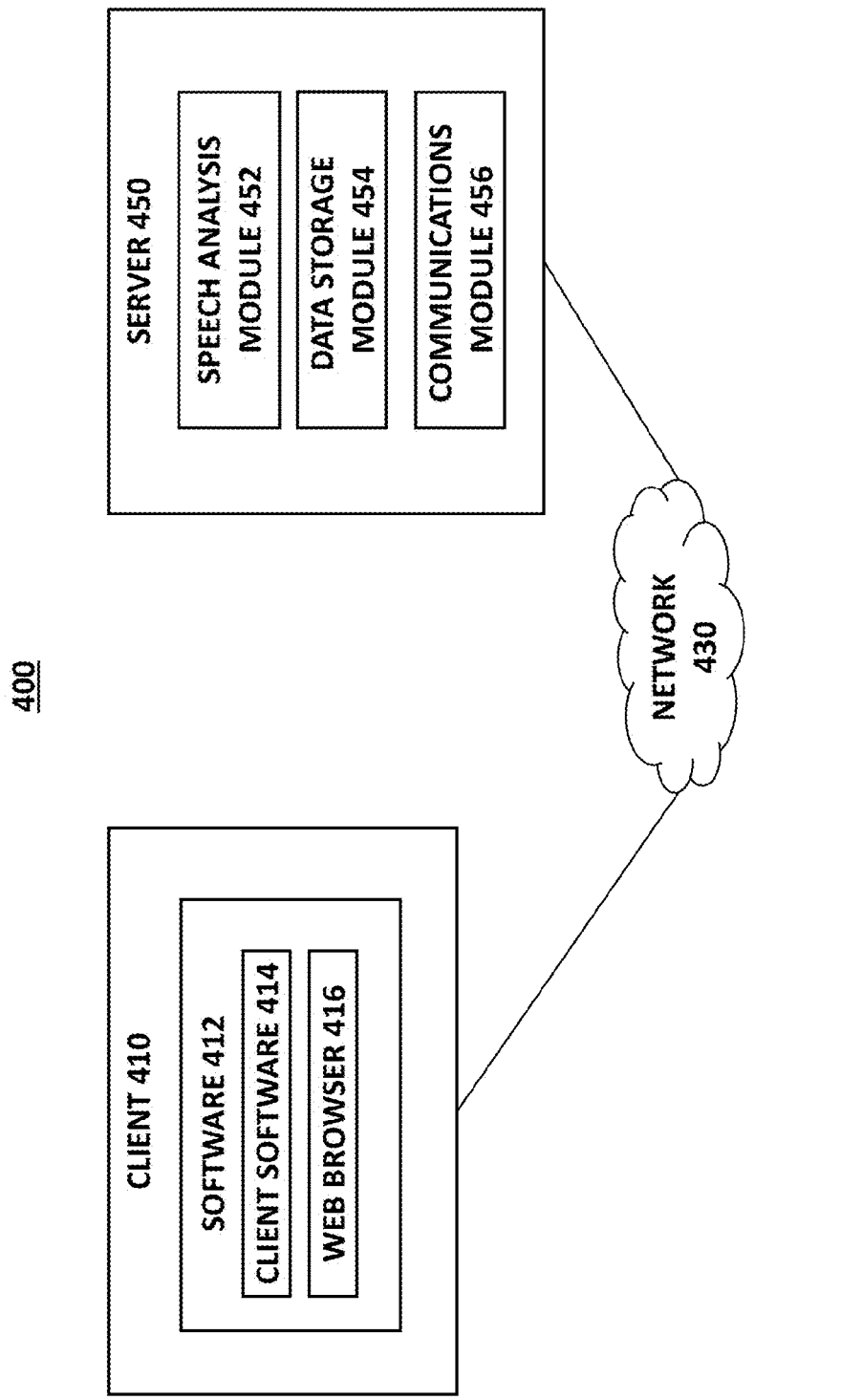
FIG. 4 shows a schematic of a conversation analysis system, according to some embodiments.

Referring to FIG. 4, in some embodiments, a system 400 for analyzing speech includes at least one client computer 410 and at least one server 450. The illustrative configuration is only for exemplary purposes, and it is intended that there can be a suitable number of clients 410 and/or servers 450. In some embodiments, client 410 and/or server 450 can perform one or more (e.g., all) steps of the above-described speech analysis techniques, including, without limitation, the steps of the training method 300 and/or the steps of the assessment method 350.

One or more communications networks 430 connect the client 410 with the server 450. The communication can take place via suitable media such as standard telephone lines, LAN or WAN links (e.g., T1, T3, 56 kb, X.25), broadband connections (ISDN, Frame Relay, ATM), and/or wireless links (IEEE 802.11, Bluetooth). Preferably, the network 430 can carry TCP/IP protocol communications, and data (e.g., HTTP/HTTPS requests, etc.) transmitted by client 410 and/or server 450 can be communicated over such TCP/IP networks. The type of network is not a limitation, however, and any suitable network can be used. Non-limiting examples of networks that can serve as or be part of the communications network 430 include a wireless or wired Ethernet-based intranet, a local or wide-area network (LAN or WAN), and/or the global communications network known as the Internet, which can accommodate many different communications media and protocols.

The client 410 is preferably implemented with software 412 running on hardware. In some embodiments, the hardware can include a personal computer (e.g., a PC with an INTEL processor or an APPLE MACINTOSH) capable of running such operating systems as the MICROSOFT WINDOWS family of operating systems from Microsoft Corporation of Redmond, Wash., the MACINTOSH operating system from Apple Computer of Cupertino, Calif., and/or various varieties of Unix, such as SUN SOLARIS from SUN MICROSYSTEMS, and GNU/Linux from RED HAT, INC. of Durham, N.C. The client 410 can also be implemented on such hardware as a smart or dumb terminal, network computer, wireless device, wireless telephone, information appliance, workstation, minicomputer, mainframe computer, personal data assistant, tablet, smart phone, smart watch, or other computing device that is operated as a general purpose computer, or a special purpose hardware device used solely for serving as a client 410. In some embodiments, the client 310 includes one or more devices operable to obtain communication from a participant in a conversation (e.g., a microphone to capture the participant's speech, a video camera to capture the participant's gestures and/or other non-verbal communication, etc.).

Generally, in some embodiments, clients 410 can be operated and used for various activities including sending and receiving electronic mail and/or instant messages, requesting and viewing content available over the World Wide Web, participating in chat rooms, or performing other tasks commonly done using a computer, handheld device, or cellular telephone. Clients 410 can also be operated by users on behalf of others, such as employers, who provide the clients 410 to the users as part of their employment.

In various embodiments, the software 412 of client computer 410 includes client software 414 and/or a web browser 416. The web browser 414 allows the client 410 to request a web page or other downloadable program, applet, or document (e.g., from the server 450) with a web-page request. One example of a web page is a data file that includes computer executable or interpretable information, graphics, sound, text, and/or video, that can be displayed, executed, played, processed, streamed, and/or stored and that can contain links, or pointers, to other web pages. Examples of commercially available web browser software 416 are INTERNET EXPLORER, offered by Microsoft Corporation, NETSCAPE NAVIGATOR, offered by AOL/Time Warner, FIREFOX offered the Mozilla Foundation, or CHROME offered by Google.

In some embodiments, the software 412 includes client software 414. The client software 414 provides, for example, functionality to the client 410 that allows a user to send and receive electronic mail, instant messages, telephone calls, video messages, streaming audio or video, or other content. Examples of client software 414 include, but are not limited to OUTLOOK and OUTLOOK EXPRESS, offered by Microsoft Corporation, THUNDERBIRD, offered by the Mozilla Foundation, and INSTANT MESSENGER, offered by AOL/Time Warner. Not shown are standard components associated with client computers, including a central processing unit, volatile and non-volatile storage, input/output devices, and a display.

In some embodiments, web browser software 416 and/or client software 414 can allow the client to access a user interface for controlling speech analysis system 400 and/or for obtaining results of speech analysis.

The server 450 interacts with the client 410. The server 450 is preferably implemented on one or more server-class computers that have sufficient memory, data storage, and processing power and that run a server-class operating system (e.g., SUN Solaris, GNU/Linux, and the MICROSOFT WINDOWS family of operating systems). System hardware and software other than that specifically described herein can also be used, depending on the capacity of the device and the size of the user base. For example, the server 450 can be or can be part of a logical group of one or more servers such as a server farm or server network. As another example, there can be multiple servers 450 associated with or connected to each other, or multiple servers can operate independently, but with shared data. In a further embodiment and as is typical in large-scale systems, application software can be implemented in components, with different components running on different server computers, on the same server, or some combination.

In some embodiments, server 450 includes a speech analysis module 452, a communications module 456, and/or a data storage module 454. In some embodiments, the speech analysis module 452 can perform one or more (e.g., all) steps of the above-described speech analysis techniques, including, without limitation, the steps of the training method 300 and/or the assessment method 350. In some embodiments, server 450 can use communications module 456 to communicate the outputs of the speech analysis module 452 to the client 410. The modules described throughout the specification can be implemented in whole or in part as a software program using a suitable programming language or languages (C++, C#, java, LISP, BASIC, PERL, etc.) and/or as a hardware device (e.g., ASIC, FPGA, processor, memory, storage and the like).

In some embodiments, speech analysis module 452 can be implemented, at least in part, as a multi-threaded program (e.g., as multiple threads executed on the same processor core with access to a shared memory space, as multiple threads executed on different processor cores with or without access to a shared memory space, etc.). For example, different language models can be assigned to different threads, and each thread can use the corresponding language model to transcribe the same conversation in parallel. Multi-threaded execution of multiple language models can improve the runtime performance of a speech recognition application by up to 2× or more.

In some embodiments, speech analysis module 452 can perform lattice rescoring at the end of every sentence, at the end of every N sentences, at the end of a conversation, or at any other suitable time. The lattice is a graph that represents the results of the automated speech recognition. Performing the rescoring less frequently than at the end of every sentence can improve the runtime performance of a speech recognition application by up to 5× or more. In some embodiments, further improvements in the runtime performance of the speech recognition application can be achieved by using a parallel program to perform the lattice rescoring on a distributed processing architecture.

A data storage module 454 can store records of conversations. The data storage module 454 can be implemented using, for example, the MySQL Database Server by MySQL AB of Uppsala, Sweden, the PostgreSQL Database Server by the PostgreSQL Global Development Group of Berkeley, Calif., or the ORACLE Database Server offered by ORACLE Corp. of Redwood Shores, Calif.

Although examples provided herein can have described modules as residing on separate computers or operations as being performed by separate computers, it should be appreciated that the functionality of these components can be implemented on a single computer, or on a larger number of computers in a distributed fashion.

The above-described embodiments can be implemented in numerous ways. For example, the embodiments can be implemented using hardware, software or a combination thereof. When implemented in software, the software code can be executed on a suitable processor or collection of processors, whether provided in a single computer or distributed among multiple computers. Further, it should be appreciated that a computer can be embodied in a number of forms, such as a rack-mounted computer, a desktop computer, a laptop computer, or a tablet computer. Additionally, a computer can be embedded in a device not generally regarded as a computer but with suitable processing capabilities, including a Personal Digital Assistant (PDA), a smart phone or another suitable portable or fixed electronic device.

Such computers can be interconnected by one or more networks in a suitable form, including as a local area network or a wide area network, such as an enterprise network or the Internet. Such networks can be based on a suitable technology and can operate according to a suitable protocol and can include wireless networks, wired networks or fiber optic networks.

Also, the various methods or processes outlined herein can be coded as software that is executable on one or more processors that employ one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, the invention can be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be non-transitory. The computer readable medium or media can be transportable, such that the program or programs stored thereon can be loaded onto one or more different computers or other processors to implement various aspects of the present invention as discussed above. The terms "program" or "software" are used herein in a generic sense to refer to computer code or set of computer-executable instructions that can be employed to program a computer or other processor to implement various aspects described in the present disclosure. Additionally, it should be appreciated that according to one aspect of this disclosure, one or more computer programs that when executed perform methods of the present invention need not reside on a single computer or processor, but can be distributed in a modular fashion amongst a number of different computers or processors to implement various aspects of the present invention.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures can be shown to have fields that are related through location in the data structure. Such relationships can likewise be achieved by assigning storage for the fields with locations in a computer-readable medium that conveys relationship between the fields. However, any suitable mechanism can be used to establish a relationship between information in fields of a data structure, including through the use of pointers, tags or other mechanisms that establish a relationship between data elements.

Also, the invention can be embodied as a method, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

In some embodiments the method(s) can be implemented as computer instructions stored in portions of a computer's random access memory to provide control logic that affects the processes described above. In such an embodiment, the program can be written in any one of a number of high-level languages, such as FORTRAN, PASCAL, C, C++, C#, Java, javascript, Tcl, or BASIC. Further, the program can be written in a script, macro, or functionality embedded in commercially available software, such as EXCEL or VISUAL BASIC. Additionally, the software can be implemented in an assembly language directed to a microprocessor resident on a computer. For example, the software can be implemented in Intel 80x86 assembly language if it is configured to run on an IBM PC or PC clone. The software can be embedded on an article of manufacture including, but not limited to, "computer-readable program means" such as a floppy disk, a hard disk, an optical disk, a magnetic tape, a PROM, an EPROM, or CD-ROM.

Some examples have been described in which conversations include speech, and the analysis of the conversations involves analyzing speech. However, the techniques described herein are not limited to spoken conversations. In some embodiments, conversations may include any suitable types of communication, including, without limitation, speech, non-verbal communication, electronic communication, etc. The techniques and conversation quality metrics described herein may be applied to any suitable type of conversation.

Some examples have been described in which sales conversations are analyzed from the perspective of a sales representative whose objective is to sell products and/or services. However, the techniques described herein are not limited to sales conversations, sales representatives, or sales-oriented objectives. In some embodiments, the techniques described herein may be applied to any suitable type of conversation, any suitable participant in a conversation, and/or any suitable objective for a conversation.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

Various aspects of the present disclosure can be used alone, in combination, or in a variety of arrangements not specifically described in the foregoing, and the invention is therefore not limited in its application to the details and arrangement of components set forth in the foregoing description or illustrated in the drawings. For example, aspects described in one embodiment can be combined in a suitable manner with aspects described in other embodiments.

TERMINOLOGY

The phraseology and terminology used herein is for the purpose of description and should not be regarded as limiting.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

EQUIVALENTS

The invention can be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A computer-implemented predictive modeling method comprising:
obtaining conversation metric data and conversation assessment data for respective conversations included in a plurality of conversations, wherein the metric data for a respective conversation include data indicative of one or more values of one or more metrics for evaluating conversation quality, wherein the one or more metric values are determined based, at least in part, on communications of two or more participants in the conversation, wherein the metrics include a proportionality metric and/or a matching metric, wherein a value of the proportionality metric depends on proportions of communication contributed to the conversation by the two or more participants, wherein a value of the matching metric depends on an extent to which a communication rate of a first of the participants matches a communication rate of a second of the participants, and wherein the assessment data for the conversation include data indicative of one or more assessments of the conversation; and
training one or more predictive models to provide one or more assessments of an ongoing conversation based, at least in part, on conversation metric data for the ongoing conversation, wherein training a first of the one or more predictive models comprises fitting the first predictive model to training data including the conversation metric data for the plurality of conversations and at least a portion of the conversation assessment data for the plurality of conversations.

2. The method of claim 1, wherein the one or more metrics for evaluating conversation quality further include a rapport metric and/or a concern-addressing metric.

3. The method of claim 2, wherein the one or more metric values include a value of the rapport metric for the conversation, wherein the value of the rapport metric indicates an extent of mutual understanding and/or agreement between the two or more participants in the conversation, and wherein the method further comprises determining the value of the rapport metric based, at least in part, on a rate of use of words indicating understanding and/or agreement in the communications of the two or more participants in the conversation.

4. The method of claim 1, wherein the metrics include the proportionality metric, and wherein the one or more metric values include a value of the proportionality metric for the conversation.

5. The method of claim 4, further comprising determining the value of the proportionality metric based, at least in part, on a first ratio of time during the conversation when the first participant is speaking to a duration of the conversation and on a second ratio of time during the conversation when the second participant is speaking to the duration of the conversation.

6. The method of claim 1, wherein the metrics include the matching metric, and wherein the one or more metric values include a value of the matching metric for the first and second participants in the conversation.

7. The method of claim 6, further comprising determining the value of the matching metric for the first and second participants in the conversation based, at least in part, on a number of words communicated by the first participant during a time period and on a number of words communicated by the second participant during the time period.

8. The method of claim 2, wherein the one or more metric values include a value of the concern-addressing metric for the conversation, and wherein the value of the concern-addressing metric indicates an extent to which the first participant addresses one or more concerns of the second participant.

9. The method of claim 8, further comprising determining the value of the concern-addressing metric based, at least in part, on a tone of speech of the second participant and/or on words used in the communication of the second participant.

10. The method of claim 1, wherein the one or more metrics for evaluating conversation quality comprise one or more first metrics for evaluating conversation quality, wherein the metric data for the conversation further include data indicative of one or more values of one or more second metrics for evaluating conversation quality, and wherein the one or more second metric values are determined based, at least in part, on communication of the first participant in the conversation.

11. The method of claim 10, wherein the one or more second metrics for evaluating conversation quality include a filler-word metric, a topicality metric, a tone metric, and/or a cadence metric.

12. The method of claim 1, wherein the one or more assessments of the conversation include data indicating (1) occurrence, during or after the conversation, of a particular event, (2) an outcome of the conversation, (3) a duration of the conversation, (4) a score assigned to the conversation, and/or (5) a score assigned to the communication of the first participant in the conversation.

13. The method of claim 1, wherein the one or more predictive models include a regression model and/or a classifier.

14. A system comprising:
one or more computers programmed to perform operations comprising:
obtaining conversation metric data and conversation assessment data for respective conversations included in a plurality of conversations, wherein the metric data for a respective conversation include data indicative of one or more values of one or more metrics for evaluating conversation quality, wherein the one or more metric values are determined based, at least in part, on communications of two or more participants in the conversation, wherein the metrics include a proportionality metric and/or a matching metric, wherein a value of the proportionality metric depends on proportions of communication contributed to the conversation by the two or more participants, wherein a value of the matching metric depends on an extent to which a communication rate of a first of the participants matches a communication rate of a second of the participants, and wherein the assessment data for the conversation include data indicative of one or more assessments of the conversation; and
training one or more predictive models to provide one or more assessments of an ongoing conversation based, at least in part, on conversation metric data for the ongoing conversation, wherein training a first of the one or more predictive models comprises fitting the first predictive model to training data including the conversation metric data for the plurality of conversations and at least a portion of the conversation assessment data for the plurality of conversations.

15. A computer-implemented predictive modeling method comprising:
determining an assessment of an ongoing conversation, wherein the assessment includes an output of a predictive model, wherein determining the assessment comprises applying a predictive model to first conversation data associated with the conversation, wherein the first conversation data include conversation metric data indicative of one or more values of one or more metrics for evaluating conversation quality, wherein the one or more metric values are determined based, at least in part, on communications of two or more participants in the conversation, wherein the metrics include a proportionality metric and/or a matching metric, wherein a value of the proportionality metric depends on proportions of communication contributed to the conversation by the two or more participants, wherein a value of the matching metric depends on an extent to which a communication rate of a first of the participants matches a communication rate of a second of the participants, wherein the predictive model is fitted to second conversation data associated with a plurality of conversations; and
providing notification of the assessment of the ongoing conversation.

16. The method of claim 15, wherein the assessment of the ongoing conversation includes a score assigned to the conversation and/or a score assigned to the communication of the first participant in the conversation.

17. The method of claim 15, wherein determining the assessment of the ongoing conversation includes predicting (1) a probability of occurrence, during or after the conversation, of a particular event, and/or (2) an outcome of the conversation.

18. The method of claim 15, wherein determining the assessment of the ongoing conversation includes estimating a quality of the ongoing conversation.

19. The method of claim 15, wherein providing the notification of the assessment of the ongoing conversation comprises displaying information indicative of the assessment.

20. The method of claim 15, further comprising:
determining a recommendation for the first participant in the ongoing conversation; and
providing the recommendation to the first participant.

21. The method of claim 20, wherein the recommendation relates to an adjustment of a value of a parameter of the communication of the first participant.

22. The method of claim 21, wherein the parameter of the communication of the first participant is selected from the group consisting of a speech rate of the first participant, a talk-to-listen ratio of the first participant, a cadence rate of the first participant, a filler-word usage rate of the first participant, a keyword usage rate of the first participant, and a tone of the first participant.

23. The method of claim 21, wherein the one or more metrics include a first metric, wherein the one or more metric values include a first value of the first metric, and wherein determining the recommendation includes:
determining a difference between the first value of the first metric and a target value of the first metric; and
determining that the adjustment of the value of the parameter of the communication of the first participant is predicted to decrease the difference between the first value of the metric and the target value of the metric.

24. The method of claim 21, wherein determining the assessment of the ongoing conversation includes predicting a probability of occurrence, during or after the conversation, of a particular event, wherein the one or more metrics include a first metric, wherein the one or more metric values include a first value of the first metric, and wherein determining the recommendation includes determining that the adjustment of the value of the parameter of the communication of the first participant is predicted to increase the probability of occurrence of the particular event.

25. The method of claim 20, wherein providing the recommendation comprises sending an electronic communication comprising data indicative of the recommendation to the first participant and/or to a supervisor of the first participant.

26. The method of claim 20, wherein providing the recommendation comprises displaying information indicative of the recommendation.

27. The method of claim 15, further comprising determining the conversation metric data indicative of the one or more values of the one or more metrics for evaluating conversation quality based, at least in part, on the communications of the two or more participants in the conversation.

28. The method of claim 27, wherein determining the conversation metric data includes applying one or more predictive models to the communications of the two or more participants, and wherein the one or more metric values include one or more outputs of the one or more predictive models.

29. The method of claim 28, wherein applying the one or more predictive models to the communications of the two or more participants includes applying the one or more predictive models to a transcript of the ongoing conversation and/or to an audio recording of the conversation.

30. A system comprising:
one or more computers programmed to perform operations comprising:
determining an assessment of an ongoing conversation, wherein the assessment includes an output of a predictive model, wherein determining the assessment comprises applying a predictive model to first conversation data associated with the conversation, wherein the first conversation data include conversation metric data indicative of one or more values of one or more metrics for evaluating conversation quality, wherein the one or more metric values are determined based, at least in part, on communications of two or more participants in the conversation, wherein the metrics include a proportionality metric and/or a matching metric, wherein a value of the proportionality metric depends on proportions of communication contributed to the conversation by the two or more participants, wherein a value of the matching metric depends on an extent to which a communication rate of a first of the participants matches a communication rate of a second of the participants, wherein the predictive model is fitted to second conversation data associated with a plurality of conversations; and
providing notification of the assessment of the ongoing conversation.

* * * * *